United States Patent
Gubbi

(10) Patent No.: US 6,934,752 B1
(45) Date of Patent: Aug. 23, 2005

(54) QUALITY OF SERVICE EXTENSIONS FOR MULTIMEDIA APPLICATIONS IN WIRELESS COMPUTER NETWORKS

(75) Inventor: Rajugopal R. Gubbi, Fair Oaks, CA (US)

(73) Assignee: ShareWave, Inc., Austin, TX (US)

(*) Notice: Subject to any disclaimer, the term of this patent is extended or adjusted under 35 U.S.C. 154(b) by 752 days.

(21) Appl. No.: 09/615,573

(22) Filed: Jul. 13, 2000

Related U.S. Application Data

(60) Provisional application No. 60/191,636, filed on Mar. 23, 2000.

(51) Int. Cl.[7] ............................................. G06F 15/173
(52) U.S. Cl. ...................... 709/225; 709/230; 709/231; 709/236; 370/392; 370/476; 370/401
(58) Field of Search ................................. 709/225, 226, 709/231, 236, 238, 227, 246, 224, 219, 230, 237; 370/230, 392, 395.21, 395.64, 395.65, 472, 401, 474, 475, 476, 471; 714/52, 751, 756, 758

(56) References Cited

U.S. PATENT DOCUMENTS

| | | | | |
|---|---|---|---|---|
| 5,570,367 A | * | 10/1996 | Ayanoglu et al. | 370/346 |
| 6,122,759 A | * | 9/2000 | Ayanoglu et al. | 714/57 |
| 6,477,669 B1 | * | 11/2002 | Agarwal et al. | 714/708 |
| 6,567,416 B1 | * | 5/2003 | Chuah | 370/418 |
| 6,594,246 B1 | * | 7/2003 | Jorgensen | 370/338 |

OTHER PUBLICATIONS

Huang et al., "MHTP–A Multimedia High Speed Transport Protocol", 1992.*
Prevost et al., "IPv6–The Next Generation Internet", 1999.*
Ganz et al., "Converged Voice, Video and Data Wired–Wireless LANs Testbed", 1999.*

International Search Report–PCT/US01/15851, Mar. 28, 2002.

Prevost S et al: "IPV6–The Next Generation Internet", British Telecommunications Engineering, British Telecommunications Engineering, London, GB, vol. 17, No. 4, Jan. 1999, pp. 225–231, XP000801952.

E. Ayanoglu, P. Pancha, A. Reibman, and S. Talwar: "Forward Error Control for MPEG–2 Video Transport in a Wireless LAN", ACM/Baltzer Mobile Networks and Applications Journal, 'Online! vol. 1, Dec. 1996, pp. 235–244, XP002188424.

Ganz et al: "Converged voice, video and data wired–wireless LANs testbed", Military Communications Conference Proceedings, 1999. MILCOM 1999. IEEE Atlantic City, NJ, USA Oct. 31–Nov. 3, 1999, Piscataway, NJ, USA, IEEE, US, Oct. 31, 1999, pp. 1297–1301, XP010369757.

Huang J–H et al: "MHTP–a multimedia high–speed transport protocol", Communication for Global Users. Including a Communications Theory Mini Conference. Orlando, Dec. 6–9, 1992, Proceedings of the Global Telecommunications Conference (GLOBECOM), New York, IEEE, US, vol. 1, Dec. 6, 1992, pp. 1364–1368, XP010062443.

B.Fox, B. Petri: "RFC 2735—NHRP Support for Virtual Private Networks", Request for Comments, 'Online! Dec. 1999, XP002188425.

* cited by examiner

*Primary Examiner*—William C. Vaughn, Jr.
(74) *Attorney, Agent, or Firm*—James J. Murphy; Thompson and Knight

(57) ABSTRACT

A networking protocol includes definitions of quality of service enhancements to provide reliable multimedia data stream connections in wireless computer networks. These enhancements may be implemented as extensions to packet headers, such as a multimedia control field made up of various sub fields.

7 Claims, 26 Drawing Sheets

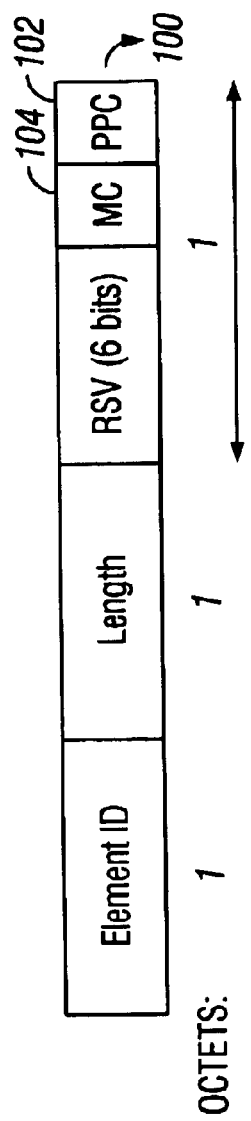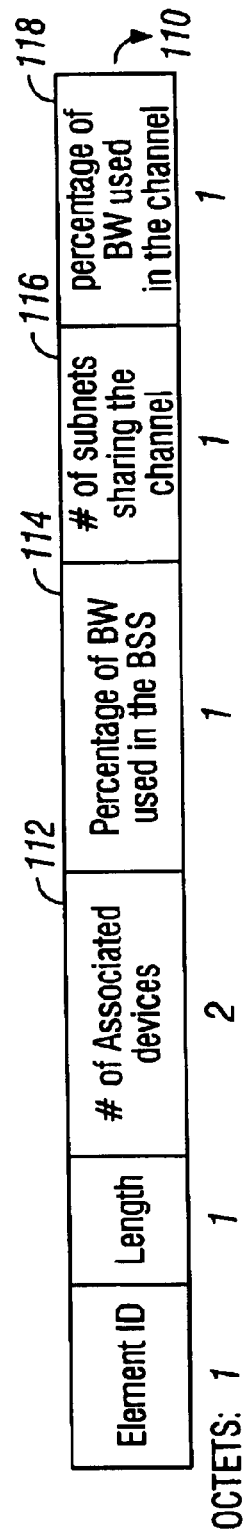

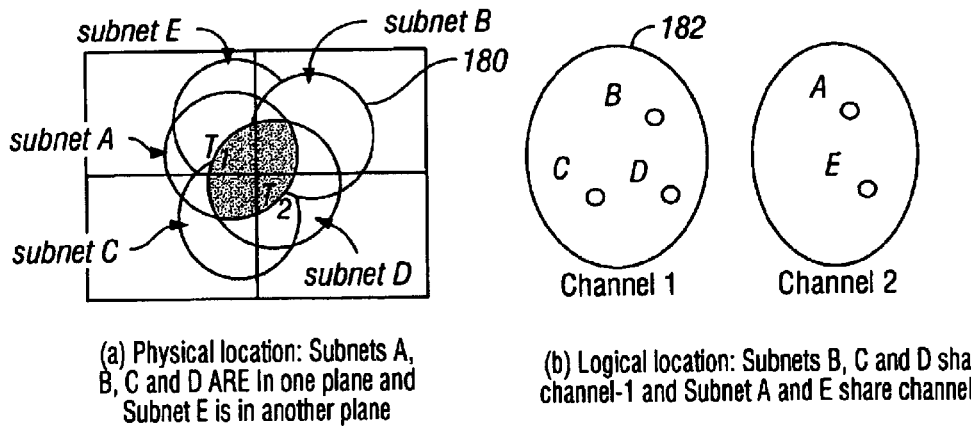

(a) Physical location: Subnets A, B, C and D ARE In one plane and Subnet E is in another plane (b) Logical location: Subnets B, C and D share channel-1 and Subnet A and E share channel-2

- Subnet B comes up first and assumes all zero BSS-SID in channel 1 with 10% bandwidth utilization
- Subnet A comes up next and assumes all zero BSS-SID in channel 2 with 80% bandwidth utilization
- Subnet D comes up:
  - Detects both channels being busy
  - Detects channel-1 with low bandwidth utilization and
  - Requests 30% bandwidth in channel-1
  - Subnet B and D share Channel 1 with 10% and 30% bandwidth usage respectively
- Subnet C comes up:
  - Detects both channels being busy
  - Detects channel-1 with low bandwidth utilization and
  - Requests 40% bandwidth in channel-1
  - Subnet B, C and D share Channel 1 with 10%, 40% and 30% bandwidth usage respectively
- Subnet E (not shown in picture) comes up:
  - Detects both channels being busy
  - Detects channel-1 and channel-2 with approximately same bandwidth utilization
  - Detects channel-2 with lower number of subnets
  - Requests 40% bandwidth in channel-2.

*FIG. 18*

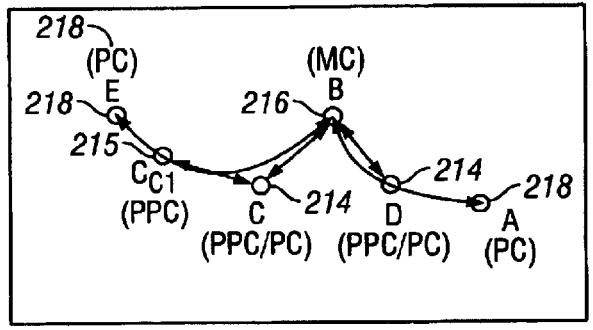

- Subnet B comes up first and assumes all zero BSS-SID
- Subnet D comes up next and requests bandwidth sharing with B
- Subnet C comes up next and requests bandwidth sharing with B and D
- Subnet A comes up:
  - Subnet B can not detect A and/or A can not detect B
  - Subnet D detects both and reports to B that A is operating in the same channel
  - B assigns D to be proxy coordinator and sends request to D for bandwidth sharing. If A can detect any packets from B or D it can also send the same request.
  - D acts as tunnel between B and A.
  - A gets a invitation from B to join the already group existing group of B, C and D.
  - A gets assigned an SS-ID and its transmission always follows that of D
- Subnet E comes up:
  - Except $C_{C1}$ no other device can detect E and or otherwise
  - E tries to use another channel and fails
  - There is only one option to E and that is to join the same group formed above, else it will be interfering with $C_{C1}$
  - $C_{C1}$ detects request from E and reports to C that E is operating in the same channel
  - C tunnels the information to B.
  - B assigns $C_{C1}$, to be proxy coordinator and sends request to C for permission.
  - C authenticates the request and provides the permission.
  - C and $C_{C1}$ together form a tunnel between B and E.
  - E gets assigned and SS-ID and its transmission always follows that of $C_{C1}$.

FIG. 21

| | |
|---|---|
| Strm Con-Request subcommand | 1 Octet |
| Subcmd Payload len | 2 Octets |
| Stream Connection Type | 1 Octet |
| Listen End Point ID (LEP-ID) | 2 Octets |
| Requester End Point (REP-ID) | 2 Octets |
| Requester End Point Information (REPI) | 4 Octets |
| Source-Sink Params for Tx-Stream | 4 Octets |
| Stream Qos Params for Tx-Stream | 28 Octets |
| Source-Sink Params for Rx-Stream | 4 Octets |
| Stream Qos Params for Rx-Stream | 28 Octets |

*FIG. 26*

Stream Direction is "1" or "2"

| | |
|---|---|
| Strm Connection Accept subcommand | 1 Octet |
| Subcmd Payload len | 2 Octets |
| Stream Connection Type | 1 Octet |
| Listen End Point ID (LEP-ID) | 2 Octets |
| Requester End Point ID (REP-ID) | 2 Octets |
| Acceptor End Point ID (AEP-ID) | 2 Octets |
| Acceptor End Point Information (AEPI) | 4 Octets |
| Source-Sink Params for Stream | 4 Octets |
| Stream Qos Params for Stream | 28 Octets |

270 → Acceptor End Point ID (AEP-ID)
272 → Acceptor End Point Information (AEPI)

Stream Direction is "3"

| | |
|---|---|
| Strm Connection Accept subcommand | 1 Octet |
| Subcmd Payload len | 2 Octets |
| Stream Connection Type | 1 Octet |
| Listen End Point ID (LEP-ID) | 2 Octets |
| Requester End Point ID (REP-ID) | 2 Octets |
| Acceptor End Point ID (AEP-ID) | 2 Octets |
| Acceptor End Point Information (AEPI) | 4 Octets |
| Source-Sink Params for Tx-Stream | 4 Octets |
| Stream Qos Params for Tx-Stream | 28 Octets |
| Source-Sink Params for Rx-Stream | 4 Octets |
| Stream Qos Params for Rx-Stream | 28 Octets |

*FIG. 27*

Stream Direction is '1' or '2' or 3

| Strm Connection reject subcommand | 1 Octet |
|---|---|
| Subcmd Payload len | 2 Octets |
| Stream Connection Type | 1 Octet |
| Listen End Point ID (LEP-ID) | 2 Octets |
| Receiver End Point ID (RxEP-ID) | 2 Octets |
| Sender End Point ID (SEP-ID) | 2 Octets |
| Receiver End Point Information (RxEPI) | 4 Octets |

*FIG. 28*

Stream Direction is '1' or '2' or '3'

| Strm Disconnect/Ack subcommand | 1 Octet |
|---|---|
| Subcmd Payload len | 2 Octets |
| Stream Connection Type | 1 Octet |
| Receiver End Point ID (RxEP-ID) | 2 Octets |
| Sender End Point Information (SEP-ID) | 2 Octets |
| Reason code | 1 Octet |
| Stream Index for Tx-Stream | 1 Octet |
| Stream Index for Rx-Stream | 1 Octet |

*FIG. 29*

Stream Direction is '1' or '2'

| Stream Authorization Request/Grant/Reject | 1 Octet |
|---|---|
| Subcmd Payload len | 2 Octets |
| Stream Connection Type | 1 Octet |
| Stream Index | 1 Octet |
| Listen End Point ID (LEP-ID) | 2 Octets |
| Rx Address | 6 Octets |
| Source-Sink Params for the stream | 4 Octets |
| Stream Qos Params for the Stream | 28 Octets |

*FIG. 30*

| DBM Command | 1 Octet |
|---|---|
| Cmd Payload len | 2 Octets |
| Subcommand structure | n Octets |

*FIG. 31*

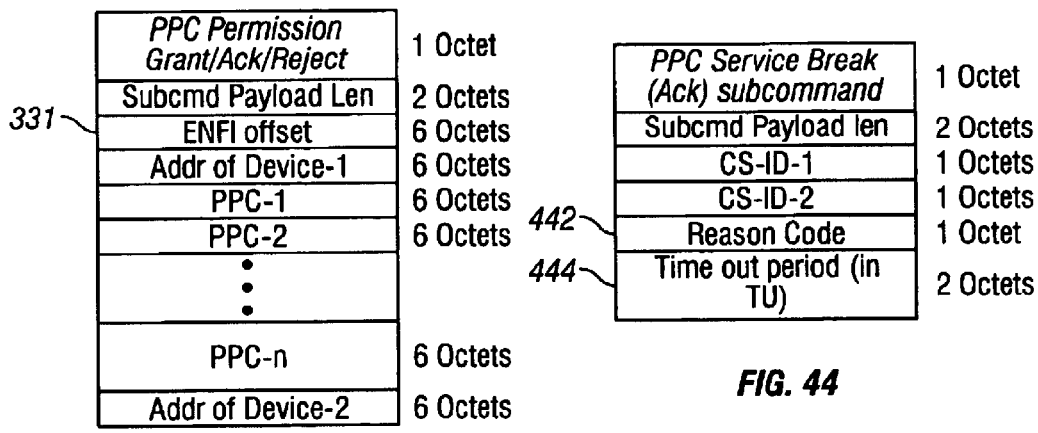
FIG. 43
FIG. 44
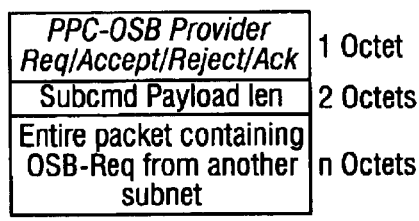
FIG. 45
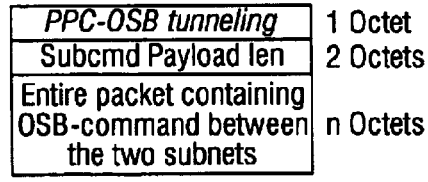
FIG. 46
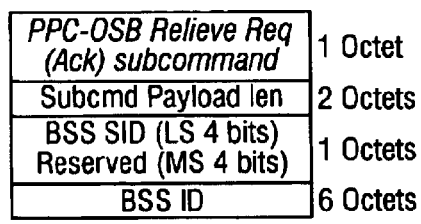
FIG. 47

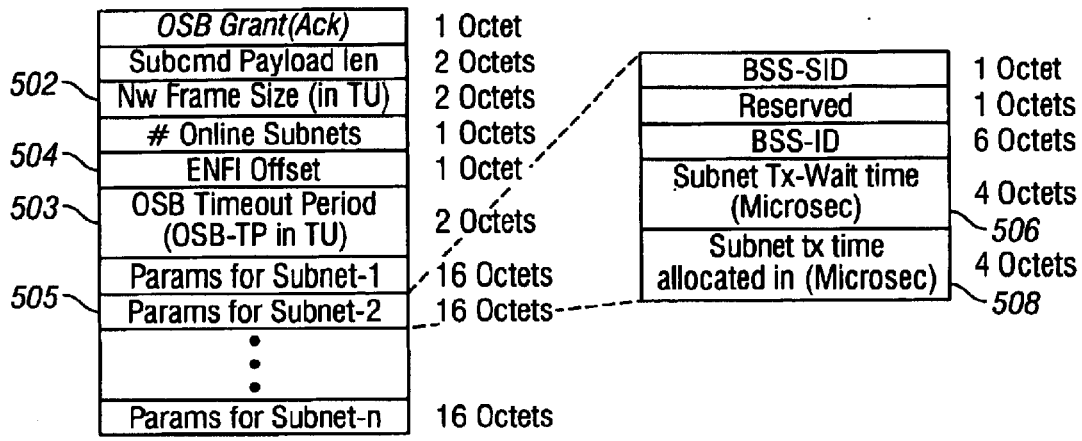
FIG. 50
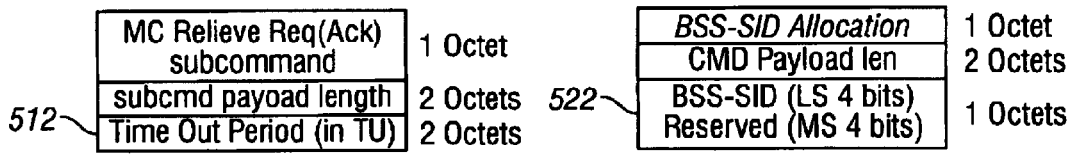
FIG. 51   FIG. 52
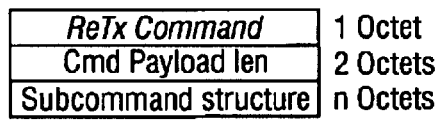
FIG. 53

QUALITY OF SERVICE EXTENSIONS FOR MULTIMEDIA APPLICATIONS IN WIRELESS COMPUTER NETWORKS

RELATED APPLICATION

The present application is related to and hereby claims the priority benefit of U.S. Provisional Application No. 60/191,636, entitled "Whitecap™: Quality of Service Enhancements to 802.11 MAC" filed Mar. 23, 2000, by Rajugopal R. Gubbi.

FIELD OF INVENTION

The present invention relates generally to a scheme for communications within a computer network and, in particular, to a scheme for communicating multimedia data across a computer network such as a local area network (LAN).

BACKGROUND

Modern computer networks allow for intercommunication between a number of nodes such as personal computers, workstations, peripheral units and the like. Network links transport information between these nodes, which may sometimes be separated by large distances. However, to date most computer networks have relied on wired links to transport this information. Where wireless links are used, they have typically been components of a very large network, such as a wide area network, which may employ satellite communication links to interconnect network nodes separated by very large distances. In such cases, the transmission protocols used across the wireless links have generally been established by the service entities carrying the data being transmitted, for example, telephone companies and other service providers.

In the home and office environments, computers have traditionally been used as stand-alone devices. However, initially at the office and more recently at home, there have been some steps taken to integrate the computer with other devices. For example, in so-called "Smart Homes", computers may be used to turn on and off various appliances and to control their operational settings. In such systems, wired communication links are used to interconnect the computer to the appliances that it will control. Such wired links are expensive to install, especially where they are added after the original construction of the home.

In an effort to reduce the difficulties and costs associated with wired communication links, some systems for interconnecting computers with appliances have utilized analog wireless links for transporting information between these units. Such analog wireless links operate at frequencies commonly utilized by wireless telephones. Although easier to install than conventional wired communication links, analog wireless communication links suffer from a number of disadvantages. For example, degraded signals may be expected on such links because of multipath interference. Furthermore, interference from existing appliances, such as televisions, cellular telephones, wireless telephones and the like may be experienced. Thus, analog wireless communication links offer less than optimum performance for a home or office environment.

In co-pending application Ser. No. 09/151,579, which is incorporated herein by reference, a computer network employing a digital, wireless communication link adapted for use in the home environment was described. That architecture included a number of network components arranged in a hierarchical fashion and communicatively coupled to one another through communication links operative at different levels of the hierarchy. At the highest level of the hierarchy, a communication protocol that supports dynamic addition of new network components at any level of the hierarchy according to bandwidth requirements within a communication channel operative at the highest level of the network hierarchy is used.

The generalization of this network structure is shown in FIG. 1. A subnet 10 includes a server 12. In this scheme, the term "subnet" is used to describe a cluster of network components that includes a server and several clients associated therewith (e.g., coupled through the wireless communication link). Depending on the context of the discussion however, a subnet may also refer to a network that includes a client and one or more subclients associated therewith. A "client" is a network node linked to the server through the wireless communication link. Examples of clients include audio/video equipment such as televisions, stereo components, personal computers, satellite television receivers, cable television distribution nodes, video teleconferencing equipment, and other office or household appliances.

Server 12 may be a separate computer that controls the communication link, however, in other cases server 12 may be embodied as an add-on card or other component attached to a host computer (e.g., a personal computer) 13. Server 12 has an associated radio 14, which is used to couple server 12 wirelessly to the other nodes of subnet 10. The wireless link generally supports both high and low bandwidth data channels and a command channel. Here a channel is defined as the combination of a transmission frequency (more properly a transmission frequency band) and a pseudo-random (PN) code used in a spread spectrum communication scheme. In general, a number of available frequencies and PN codes may provide a number of available channels within subnet 10. As is described in the co-pending application cited above, servers and clients are capable of searching through the available channels to find a desirable channel over which to communicate with one another.

Also included in subnet 10 are a number of clients 16, some of which have shadow clients 18 associated therewith. A shadow client 18 is defined as a client which receives the same data input as its associated client 16 (either from server 12 or another client 16), but which exchanges commands with server 12 independently of its associated client 16. Each client 16 has an associated radio 14, which is used to communicate with server 12, and some clients 16 may have associated subclients 20. Subclients 20 may include keyboards, joysticks, remote control devices, multi-dimensional input devices, cursor control devices, display units and/or other input and/or output devices associated with a particular client 16. A client 16 and its associated subclients 20 may communicate with one another via communication links 21, which may be wireless (e.g., infra-red, ultrasonic, spread spectrum, etc.) communication links.

Each subnet 10 is arranged in a hierarchical fashion with various levels of the hierarchy corresponding to levels at which intra-network component communication occurs. At a highest level of the hierarchy exists the server 12 (and/or its associated host 13), which communicates with various clients 16 via the wireless radio channel. At other, lower levels of the hierarchy the clients 16 communicate with their various subclients 20 using, for example, wired communication links or wireless communication links such as infrared links.

Where half-duplex radio communication is used on the wireless link between server 12 and clients 16, a communication protocol based on a slotted link structure with dynamic slot assignment is employed. Such a structure supports point-to-point connections within subnet 10 and slot sizes may be re-negotiated within a session. Thus a data link layer that supports the wireless communication can accommodate data packet handling, time management for packet transmission and slot synchronization, error correction coding (ECC), channel parameter measurement and channel switching. A higher level transport layer provides all necessary connection related services, policing for bandwidth utilization, low bandwidth data handling, data broadcast and, optionally, data encryption. The transport layer also allocates bandwidth to each client 16, continuously polices any under or over utilization of that bandwidth, and also accommodates any bandwidth renegotiations, as may be required whenever a new client 16 comes on-line or when one of the clients 16 (or an associated subclient 20) requires greater bandwidth.

The slotted link structure of the wireless communication protocol for the transmission of real time, multimedia data (e.g., as frames) within a subnet 10 is shown in FIG. 2. At the highest level within a channel, forward (F) and backward or reverse (B) slots of fixed (but negotiable) time duration are provided within each frame transmission period. During forward time slots F, server 12 may transmit video and/or audio data and/or commands to clients 16, which are placed in a listening mode. During reverse time slots B, server 12 listens to transmissions from the clients 16. Such transmissions may include audio, video or other data and/or commands from a client 16 or an associated subclient 20. At the second level of the hierarchy, each transmission slot (forward or reverse) is made up of one or more radio data frames 40 of variable length. Finally, at the lowest level of the hierarchy, each radio data frame 40 is comprised of server/client data packets 42, which may be of variable length.

Each radio data frame 40 is made up of one server/client data packet 42 and its associated error correction coding (ECC) bits. The ECC bits may be used to simplify the detection of the beginning and ending of data packets at the receive side. Variable length framing is preferred over constant length framing in order to allow smaller frame lengths during severe channel conditions and vice-versa. This adds to channel robustness and bandwidth savings. Although variable length frames may be used, however, the ECC block lengths are preferably fixed. Hence, whenever the data packet length is less than the ECC block length, the ECC block may be truncated (e.g., using conventional virtual zero techniques). Similar procedures may be adopted for the last block of ECC bits when the data packet is larger.

As shown in the illustration, each radio data frame 40 includes a preamble 44, which is used to synchronize pseudo-random (PN) generators of the transmitter and the receiver. Link ID 46 is a field of fixed length (e.g., 16 bits long for one embodiment), and is unique to the link, thus identifying a particular subnet 10. Data from the server 12/client 16 is of variable length as indicated by a length field 48. Cyclic redundancy check (CRC) bits 50 may be used for error detection/correction in the conventional fashion.

For the illustrated embodiment then, each frame 52 is divided into a forward slot F, a backward slot B, a quiet slot Q and a number of radio turn around slots T. Slot F is meant for server 12-to-clients 16 communication. Slot B is time shared among a number of mini-slots $B_1$, $B_2$, etc., which are assigned by server 12 to the individual clients 16 for their respective transmissions to the server 12. Each mini-slot $B_1$, $B_2$, etc. includes a time for transmitting audio, video, voice, lossy data (i.e., data that may be encoded/decoded using lossy techniques or that can tolerate the loss of some packets during transmission/reception), lossless data (i.e., data that is encoded/decoded using lossless techniques or that cannot tolerate the loss of any packets during transmission/reception), low bandwidth data and/or command (Cmd.) packets. Slot Q is left quiet so that a new client may insert a request packet when the new client seeks to log-in to the subnet 10. Slots T appear between any change from transmit to receive and vice-versa, and are meant to accommodate individual radios' turn around time (i.e., the time when a half-duplex radio 14 switches from transmit to receive operation or vice-versa). The time duration of each of these slots and mini-slots may be dynamically altered through renegotiations between the server 12 and the clients 16 so as to achieve the best possible bandwidth utilization for the channel. Note that where full duplex radios are employed, each directional slot (i.e., F and B) may be full-time in one direction, with no radio turn around slots required.

Forward and backward bandwidth allocation depends on the data handled by the clients 16. If a client 16 is a video consumer, for example a television, then a large forward bandwidth is allocated for that client. Similarly if a client 16 is a video generator, for example a video camcorder, then a large reverse bandwidth is allocated to that particular client. The server 12 maintains a dynamic table (e.g., in memory at server 12 or host 13), which includes forward and backward bandwidth requirements of all on-line clients 16. This information may be used when determining whether a new connection may be granted to a new client. For example, if a new client 16 requires more than the available bandwidth in either direction, server 12 may reject the connection request. The bandwidth requirement (or allocation) information may also be used in deciding how many radio packets a particular client 16 needs to wait before starting to transmit its packets to the server 12. Additionally, whenever the channel conditions change, it is possible to increase/reduce the number of ECC bits to cope with the new channel conditions. Hence, depending on whether the information rate at the source is altered, it may require a dynamic change to the forward and backward bandwidth allocation.

Another scheme for communicatively coupling components of a computer network is described in a standards document promulgated by the Institute of Electrical and Electronic Engineers (IEEE), IEEE Std 802.11, 1999 Edition, entitled "*Information technology— Telecommunications and information exchange between systems—Local and metropolitan area networks—Specific requirements— Part* 11: *Wireless LAN Medium Access Control (MAC) and Physical Layer (PHY) Specifications*" (hereinafter "the 802.11 standard"). One drawback of this scheme, however, is that it does not make accommodations for the transport of multimedia information within a network, as does the scheme described in the above-cited co-pending application.

The operation of the Point Coordinator Function (PCF) as defined in the 802.11 standard provides for contention free periods (CFPs) during the network operation. However as the PCF was mainly designed to transfer low rate voice over the WLAN, it has many drawbacks when used to transport multimedia data.

In order to transport multimedia, latency requirements must be very stringent. However, the PCF does not guarantee the availability of the beacon period itself; a DCF-only station can manage to occupy the channel and delay the beacons arbitrarily. These delays can be as large as the maximum size of the data frame that is supported in the 802.11 standard. Additionally, the PC uses a DIFS plus a random back-off delay to start a CFP when the initial beacon is delayed because of deferral due to a busy medium. This further complicates the problem of providing a periodic opportunity for the stations (STAs) to transmit their data.

Increasing the timing issues affecting multimedia transport is the fact that the PCF is an access point (AP) centric data transfer method and it does not provide independent peer-to-peer data transfers during the CFPs. All the transmissions from any device must always be polled by the point coordinator (PC) network element. In multimedia WLANs, this kind of star topology adds unacceptable latencies and unnecessarily decreases network efficiency by requiring the PC to behave like a data repeater between the two stations wishing to communicate during a CFP.

Another factor detrimental to multimedia data transport is inefficient operation in channel overlap conditions. There is a risk of repeated collisions if multiple, overlapping, PCs operate in the same PHY channel. There is the added complication of a PC being required to lose control of the medium for a random number of slot times periodically. As the home market widens and the wireless stations are used by apartment dwellers, the throughput reduction due to this problem becomes unacceptable for the user. Further, two sets of devices belonging to the same user can form two basic service sets (BSSs) each with a PC. This causes unnecessary increase in beacon traffic and exacerbates other problems due to collisions.

At the physical level (PHY), there is no support for the Quality of service (Qos) that is essential in supporting the multimedia data traffic over WLAN. If the operating PHY medium gets too noisy, there is no defined mechanism for the PC to look for a better channel and move the network operations to this new channel. This is extremely important when a multimedia data is being transported over an inherently noise prone wireless medium.

Lack of prioritization also presents a challenge to the transport of multimedia data. When a PC is polling for an asynchronous data stream and a multimedia data stream, like audio/video, there is no defined method for a station streaming multimedia to get priority in channel usage. This can cause problems like the user having to experience dropped video frames or audio clicks simply because there is an asynchronous print job running in another room. Similarly, there is no defined mechanism for a station with larger data rate to get priority over the station with smaller data rate when both the data streams are of equal importance. A good example of this in the home environment is one station streaming audio to the speakers in the kitchen while another one streaming audio-video (AV), like a digital video disc movie (DVD), to a television set.

SUMMARY OF THE INVENTION

The present scheme, although applicable to wired networks, is offered as a supplement to the scheme proposed in the 802.11 standard for wireless networks in an effort to provide the most advanced and useful description. This invention provides Quality of service extensions for multimedia applications communicating across a computer network, and as mode of example, these extensions are defined in relation with existing issues that apply to 802.11 WLANs. Some of the main extensions proposed are the following: the medium access control (MAC) header is extended to include the components for multimedia support; the network topology extensions include tighter definition of the point coordinator (PC); peer-peer connections during contention free periods (CFPs); alternate PC and proxy PC. The Quality of Service (QoS) related extensions include the simplifying the operation during CFPS, support of streams, stream priority, synchronization of time division multiplex (TDM) transmissions by devices during CFP, dynamic bandwidth management, channel protection using error control coding and negotiable retransmission parameters. By dynamically negotiating for the priority, bandwidth and the retransmission parameters for each stream separately, the network capacity is optimally distributed among different multimedia streams and the latency control is achieved. In order to better their inter-operation with multimedia capable devices, there are also proposed extensions to the operation of stations that only communicate with the distributed coordination function (DCF), DCF-only stations.

This invention enhances the 802.11-MAC to provide QoS to multimedia streams. For this purpose it introduces concept of streams at MAC and bandwidth management policies for the streams. This description is centered on the already existing point coordinator function (PCF) and recommends direct station to station data transmission without having to relay it through a PC. The proposal maintains complete compatibility with the current definition of 802.11-MAC. In essence the following enhancements are proposed.
1. Use of MM frame type (frame type=b11).
2. Use of MM-data and MM-command frame subtypes. MM-data is for the multimedia data that needs to be transported and MM-Command is for the new MAC management frames.
3. A new MM-control field containing frame position, stream index, BSS session D and time stamp.
4. Capability information to include multimedia capability and PC capability.
5. Additional elements are defined for Beacon, probe response frames. These elements are to indicate the current load and indication on the bandwidth shared with other overlapping subnets in the same channel. Additional element to indicate whether the PC is actually Proxy.PC is also defined.
6. Forward error correction based on Reed Soloman coding at MAC level is recommended to improve the channel efficiency and help provide QoS.
7. A selective retransmission mechanism to improve the efficiency of the stream transportation is defined.
8. Stream Management and dynamic bandwidth negotiation schemes are defined.
9. Various new management commands are defined to cover the stream creation, dynamic bandwidth management, retransmission, operation of PC in overlapped subnet scenario, proxy services, channel change Mechanism to group management commands, etc.
10. An efficient mechanism to combine the management commands into one frame is defined.

BRIEF DESCRIPTION OF THE DRAWINGS

The present invention is illustrated by way of example, and not limitation, in the figures of the accompanying drawings in which like reference numerals refer to similar elements and in which:

FIG. 10 illustrates an example of an element for a Beacon Generator Properties according to one embodiment of the present invention;

FIG. 11 illustrates an example of an element for load indication according to one embodiment of the present invention;

FIG. 18 illustrates an example of overlapping subnets sharing the same channel according to one embodiment of the present invention;

FIG. 21 illustrates an example of the operation of a proxy-coordinator according to one embodiment of the present invention;

FIG. 26 illustrates an example of a Stream Connection request subcommand for transmit and receive streams according to one embodiment of the present invention;

FIG. 27 illustrates an example of a Stream Connection accept subcommand structure for transmit and/or receive streams according to one embodiment of the present invention;

FIG. 28 illustrates an example of a Stream Connection reject subcommand according to one embodiment of the present invention structure;

FIG. 29 illustrates an example of a Stream disconnect subcommand according to one embodiment of the present invention;

FIG. 30 illustrates an example of a Stream authorization Request/Grant/Reject subcommand structure according to one embodiment of the present invention;

FIG. 31 illustrates an example of a Dynamic Bandwidth Management command according to one embodiment of the present invention;

FIG. 43 illustrates an example of a PPC permission grant/ack subcommand according to one embodiment of the present invention;

FIG. 44 illustrates an example of a Proxy Service Reject/Break subcommand according to one embodiment of the present invention;

FIG. 45 illustrates an example of a Proxy coordinator provider request subcommand for the OSB purposes according to one embodiment of the present invention;

FIG. 46 illustrates an example of a PPC-OSB tunneling subcommand according to one embodiment of the present invention;

FIG. 47 illustrates an example of a Proxy coordinator relieve request subcommand according to one embodiment of the present invention;

FIG. 50 illustrates an example of as Overlapping Subnet Bandwidth Grant subcommand according to one embodiment of the present invention;

FIG. 51 illustrates an example of a Master Coordinator relieve request subcommand according to one embodiment of the present invention;

FIG. 52 illustrates an example of a Proxy coordinator command according to one embodiment of the present invention;

FIG. 53 illustrates an example of a Retransmission command according to one embodiment of the present invention;

DETAILED DESCRIPTION

Figure 1:
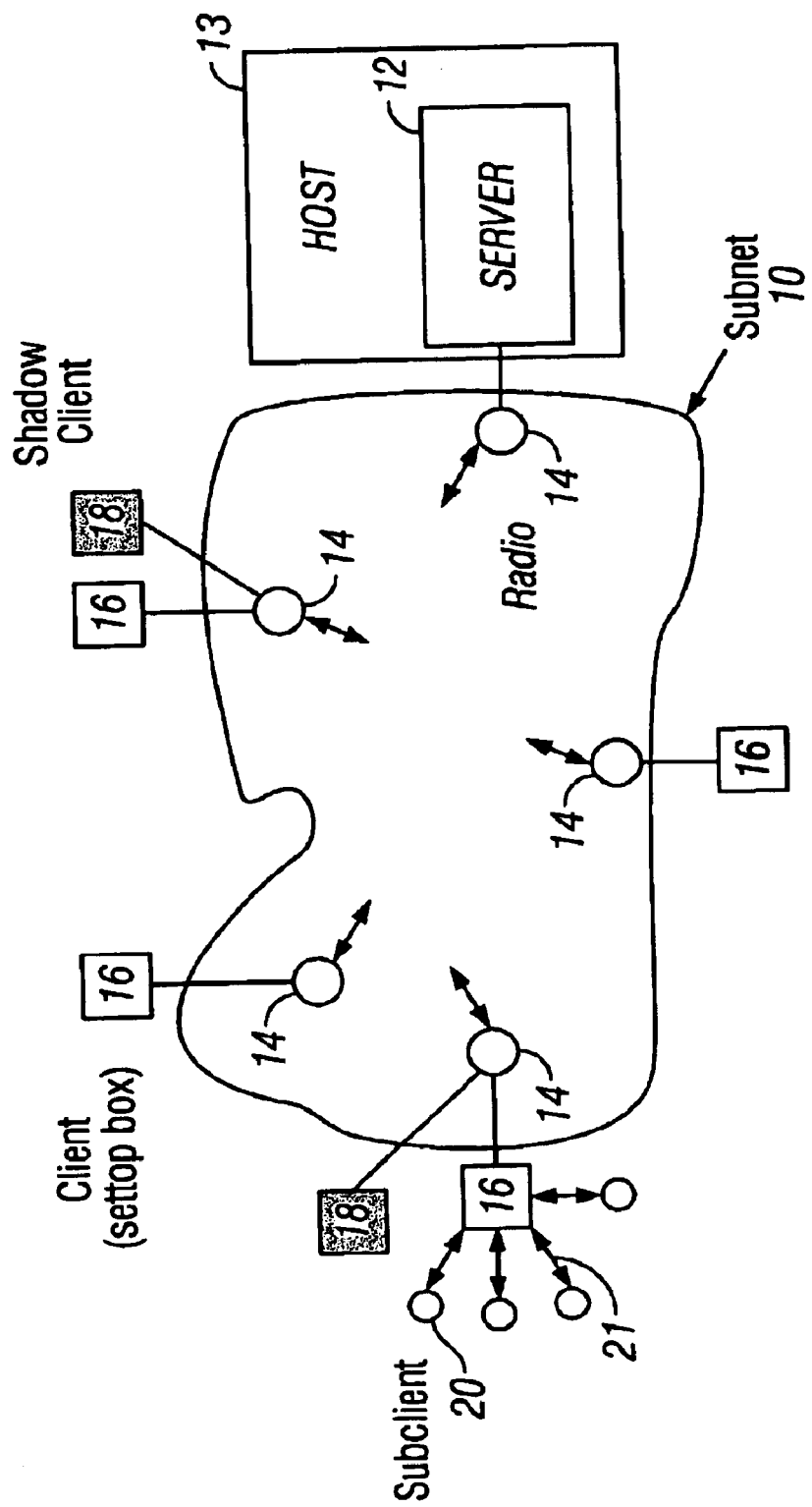
FIG. 1 illustrates a generalized network structure that is supported by a wireless communication protocol configured in accordance with an embodiment of the present invention.
Figure 2:
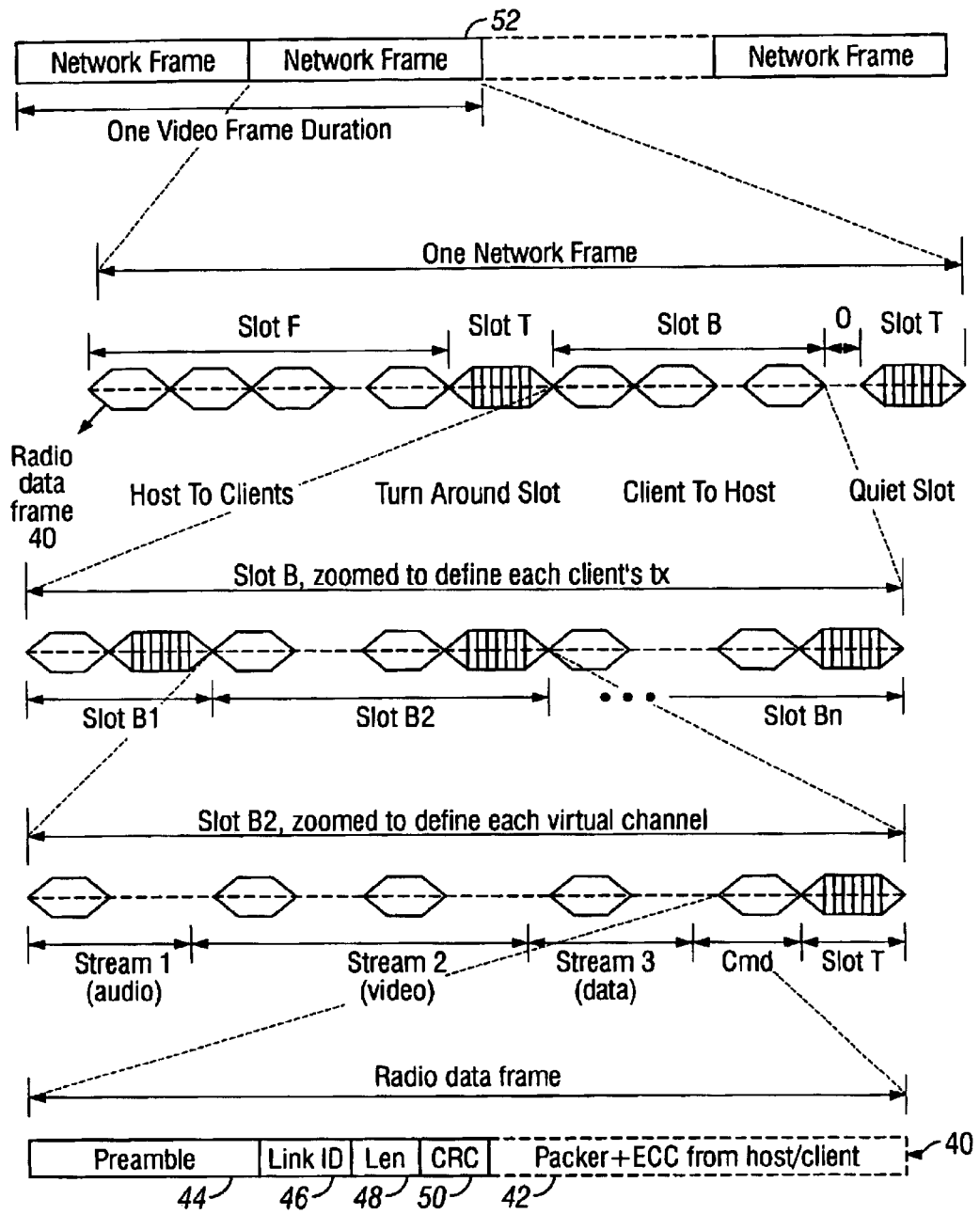
FIG. 2 illustrates a hierarchical arrangement for the transmission of data and control information within a subnet according to one embodiment of the present invention.

A computer network communication protocol describing a set of Quality of service related extensions for multimedia applications is disclosed herein. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope.

A wireless local area network compliant with the 802.11 standard (802.11 WLAN) provides a good support for device connection and authentication, and has concentrated mainly on the transport of asynchronous data over a wireless medium. These features of the 802.11 standard are sufficient for data network applications. On the other hand, the scheme described in the above-cited co-pending application (hereinafter referred to as the "Whitecap" scheme) is designed from ground up for the transport of multimedia data streams with all the multimedia services required by a WLAN. Recent efforts in the development of the 802.11 standard and the Whitecap architectures are leading to higher bit rates and better products in the market. Many manufacturers are able to produce consumer electronic devices that provide the flexibility of a wireless solution at home or at the office.

Nevertheless the incompatibilities among these wireless devices have limited the acceptance of wireless networks in these markets, specially the home market. With the growth of this consumer sector, it is vital for the 802.11 standard to have extensions to support multimedia data, like CD quality audio and video streams, in order to succeed in this market.

Hence, a merger of these two architectures would greatly benefit the end user and would be welcomed in the market. Keeping this in mind, this invention merges the mechanisms of Whitecap into the point coordinator function defined in the 802.11 standard.

The following description proposes the best mode of implementation known to the inventor for an efficient multimedia data communication scheme. As the current state of the art and consumer trends indicate that wireless communication systems will be the best method of implementing communication networks, without limiting the invention to this technology, this description is focused on wireless networks, referencing as the basic underlying computer network architecture the 802.11 based WLANs. The proposed extensions to the point coordinator function (PCF) can be broadly categorized into two groups; network topology support and quality of service (Qos) for multimedia data. The quality of service extensions can be further divided into dynamic slot support, streaming support, priority support, network synchronization support, dynamic bandwidth management, channel robustness support, dynamic channel change support and overlapping subnet support. Additionally this invention presents a set of basic of services that can support future developments in the field and hence provides for a long lasting protocol.

1 Definitions

To assist in understanding the various extensions submitted this section provides the definitions of the terminology used in this description.

Multimedia Station (MMS): a network component having all the extensions for transporting multimedia data as disclosed in this invention.

Point Coordinator (PC): Point coordinator as defined in the 802.11 standard with the added functionality for multimedia data transport capability.

Alternate Point Coordinator (APC): An MMS that is capable of becoming a PC. Multiple devices in a subnet may have PC capabilities and a voting scheme is followed to choose one of them to become the PC for the subnet.

Proxy Point Coordinator (PPC): An MMS that is providing proxy services. The nature of proxy service can be of two types, first, within the subnet between two devices providing data repeater services. Second, it can be between multiple subnets for the purposes of negotiations to share the bandwidth in the same channel.

Network frame: Network frame is defined as the periodically occurring frame starting from the beacon transmission of a PC and containing transmissions of the MMSs within the PC's local BSS, followed by the transmissions of MMSs in overlapping BSSs sharing the same PHY channel.

Streams: A set of MAC frames belonging to the same application level data, typically with high bit content and timing requirements (isochronous). For example, video, high fidelity (CD quality) audio, or videoconferencing connections.

Stream Management: Process through which a stream is initiated within a subnet. This involves authorization of the receive device for consuming the device and making sure sufficient BW is available to entertain the QoS requirements of the stream.

Subnet: A cluster consisting of one PC and several clients attached to it. The word Subnet is used in synonym to a BSS in 802.11 network.

DTDMA: Dynamically adjustable Time division Multiple Access.

TU: Time Unit used in 802.11 architecture (1024 micro seconds).

Basic Service Set Session Identification (BSS-SID): BSS-SID is the session ID of the BSS. This is applicable when multiple overlapping BSSs are sharing the same channel.

Master Coordinator (MC): Is the point coordinator with the BSS-SID zero. This PC provides the beacon that marks the beginning of the network frame and also provides the management for bandwidth sharing among the overlapping BSSs that are currently sharing the same PHY channel.

Dynamic Bandwidth management (DBM). This involves devices requesting for certain bandwidth and the PC allocating it taking into account the requests from all the devices in its subnet and the bandwidth allocations to overlapping subnets.

Error Correction Coding (ECC) to recover the corrupted bits and packets from the channel.

2 Network Topology

The disclosed enhancements to the 802.11-MAC architecture support multimedia data flow, both in a server-client and a peer-peer fashion. The basic architecture described in this embodiment is based on PCF (point coordinator function). All devices share the media in a dynamically adjustable TDMA fashion.

In one embodiment, the present invention may support several types of devices. They may be very thin clients, thin clients, fat clients or personal computers. Very thin clients are those that have neither significant processing capability nor data storage capability. Examples of this are simple input/output devices like wireless keyboards and display units. Several set top boxes also fall into this category as they neither can process the incoming data nor can provide any significant storage spaces. Thin clients are those having considerable magnitude of processing ability but little or no storage capability. Examples of these are IP phones. Fat clients could have both processing ability and data storage capability. Usually these types of clients are specific to the applications they are designed for. The personal computers are considered as a separate type of devices in this discussion as they are unique owing to their richness in processing ability, data storage capability and type of applications they can run.

Either one of the aforementioned devices, depending on their capabilities, may be classified in one of the following functional types of network components within a subnet: a point coordinator (PC), an alternate point coordinator (APC), a proxy point coordinator (PPC) or a multimedia station (MMS). A point coordinator is the device that is responsible for operation of devices in contention free period (CFP). PC is also responsible for slot timings, synchronization and dynamic network management.

A proxy point coordinator is a client device providing a time reference for a low power or a hidden device that cannot directly communicate with the PC. Whenever a device that is trying to reach the PC fails to do so, a client device (MMS) that can receive from both the PC and the new client device can volunteer to provide a time reference and a tunnel for the communication between them. This is discussed in detail later.

An APC is a client with the capabilities of a PC. A set of devices in the subnet can be configured as APC. Whenever there is a break down at the current PC, one of these devices can take over the responsibility of the PC thus avoiding network failure.

2.1 Responsibilities of Multimedia Capable Station (MMS)

An MMS is a STA with enhancements to support multimedia applications. Its multimedia capabilities are defined in the following requirements. An MMS should, Support DCF based contention period operations for backward compatibility;

Communicate with non-MM STA's ONLY during the contention period, as the acknowledgement from the non-MM STA can disrupt the time division multiplexed (TDM) behavior of the CFP transmissions;

Establish connection and negotiate for bandwidth in the contention period using DCF mechanisms;

Recognize beacon from PC and use it for time reference;

Make use of the allotted time slot in the CFP effectively and efficiently;

Provide PC with the bandwidth requirements periodically;

Establish the required stream connections with the other MMSs during CFP;

Support forward error correction (ECC), CRC and retransmission mechanisms;

Measure the channel status continuously and provide the same as feedback to PC periodically;

Not expect polling by the PC. This proposal asks to remove the polling mechanism from PCF for the reason of bandwidth overhead. Additionally the removal of polling mechanism from PC saves the processing overhead at the PC; and an MMS can optionally measure and report collisions during non-CFP so that the PC can optimize the CFP v/s non-CFP communications.

2.2 Responsibilities of the Point Coordinator (PC)

The proposed multimedia enhancements to PC are described in the following requirements.

A PC must also support all the MMS capabilities.

Mandatory single PC for multimedia networks: this proposal mandates that there is one and only one PC per network. During the network installation, the user should be able to pick a device for a designated PC or by default the very first PC in the network will be the designated PC. Whenever there are no PCs, a capable MMS should be able to become a PC when a request for CFP operation is detected. When there are more than one PC capable STAs, then they are required to vote among themselves and choose one among them to be the PC depending on the available network resources on the PCs.

Responsibilities of sending beacon frames: This is same as that is currently defined. The beacons provide the time reference to the MMSs for their transmissions.

Responsibility of allocating transmission slots to different stations within CFP: The PC is required to negotiate and/or allocate the transmission slot duration within CFP for each MMS.

Responsibility of channel monitoring: The PC is required to monitor the bandwidth utilization by the MMSs during CFP and renegotiate the bandwidth with them, if required, so as to optimize the network utilization.

Dynamic channel change: The PC is required to measure the channel losses, receive the feedback on channel status from the individual MMSs and assess the channel conditions. If the current channel is severe, the PC is required to momentarily pause the CFP operation and look for a better channel. Once a better channel is found, the PC is required to inform all the associated STAs in the current channel and move the network operations to the new channel. The same mechanism, but in a slightly different manner, may be used when the current channel is occupied and a new PC wishes to establish a CFP. The new PC should check other channels for a free channel before starting negotiations to share bandwidth with a currently operating PC during a CFP.

Responsibility of negotiating with the PC of another network for channel sharing: Due to the limited number of channels in DS PHY multiple PCs that do not authenticate each other need to operate in the same PHY channel. A good example for this is where PCs from two different networks are located in physically close apartments in an apartment complex. Hence, when the operation of an unidentified PC in the same PHY channel is recognized by a PC trying to establish a CFP, the second PC should send management packets to the first PC and negotiate for the CFP duration.

Responsibility of sharing bandwidth with pure-DCF stations: A PC should always monitor the contention period and make sure there is at least one data frame plus acknowledgement duration left free in the contention period.

2.3 Alternate Point Coordinator (APC)

In any network architecture based on coordinator-station relations, it is important to have backup during the failure of the coordinator. This is due to the fact that in the absence of PC beacons, the rest of the BSS will be non-functional. Thus in one embodiment of the present invention, a mechanism is provided to hand over the responsibilities of the PC to an alternate point coordinator (APC) and hence avoid the failure of the entire network. An APC is an MMS capable of being a PC, but not designated to be the default PC. When such a station is operating as a PC, all the responsibilities of a PC are applicable. On the other hand, when this station is not operating as a PC, then it simply behaves like an MMS.

To help in the hand over of responsibility of a PC to an APC, all the APCs are periodically updated with a table of currently operating MMSs and their operating parameters. If an APC is away/off and associates itself during an ongoing session, it either waits for the PC to provide such an update or it can request the information. If there are multiple APCs volunteering to take over the responsibility of a failed, then these APCs may vote for the responsibility. This is achieved by broadcasting a list of the available resources at each of these volunteering APCs. The APC with the largest number of resources wins the negotiation. This can take multiple iterations of negotiations depending on the type of APCs and number of APCs involved. If there is more than one device with equal resources at the final negotiation stage, then the device with the highest MAC address is chosen for this responsibility. The list of resources that are used in this negotiation is shown in Table 1 and they are arranged in their order of priority.

Along with the above, a multimedia command should also contain a field to indicate whether the device was designated as a PC during its installation. The comparison is performed from top to bottom and the decision is made whenever a better resource comparison is found. If there are multiple devices designated as PCs during installation, then similar negotiations may be held and the device with more resources wins the negotiation. The other devices that are not designated as a PC during installation leave the negotiation once such a device enters the fray. Three scenarios in which an MMS replaces the current PC are discussed in the following sections.

TABLE 1

| Resource ID - also serves as priority | Resource description | Resource magnitude | Comparison rule |
|---|---|---|---|
| 1 | Transmission power | Default value is 5. Low power devices are marked 0 and the vendor can grade the rest depending on the PHY range. | Higher is preferred. For example a low power device should be avoided from becoming a PC. |
| 2 | Designated mode | 0: Default. No designation. 1: No designation. But capable of serving as PC. 2: user designated as APC. 3: user designated as PC. | Higher is preferred. |
| 3 | Non-volatile storage through physical, wired connection | A class for this resource needs to be defined for every device with zero as default. Attachment to PC is graded as 10. The cable modem can get a grade between 1 and 10. The actual decision of the resource class is left to implementation | Higher class resource is preferred |
| 4 | # of outside connections | # of connections like ISP, cable modem etc. | Device with smaller # is preferred |
| 5 | # of currently active outside connections | # of outside connections that are actively used currently | Device with smaller # is preferred as the processor bandwidth |

TABLE 1-continued

| Resource ID - also serves as priority | Resource description | Resource magnitude | Comparison rule |
|---|---|---|---|
| | | | available for PC operations will be limited |
| 6 | Total system Memory | In Kbytes | Larger the preferred |
| 7 | Currently available free memory | In Kbytes | Larger the preferred |
| 8 | Processor | Need guidelines to define classes for this element. For eg. ARM7-20 Mhz is class-1, etc. | Higher class processor is preferred |
| 9 | Max raw PHY bandwidth | max rate of PHY | Larger the better |
| 10 | Currently requested transmission bandwidth | This is the duration of the slot that is requested by the MMS once the PC is chosen | Smaller is chosen as there is more processor bandwidth to perform the PC operations |
| 11 | MAC address | The MAC address of the device | Larger MAC address is chosen. |

2.4 Proxy Point Coordinator (PPC)

A proxy point coordinator is an MMS acting as a proxy PC between the actual PC and another MMS requesting a connection with the PC. The ability to become a PPC is optional for MMSs. A PPC comes into action when it recognizes that a request from an MMS is going unanswered by the operating PC. This may occur because of a hidden node problem.

When an MMS recognizes that request-calls from another MMS are going unanswered by the currently operating PC, then it may volunteer to be a PPC. If it is not already associated with the operating PC, it so associates itself and obtains permission to be the PPC for the requesting MMS. Once the operating PC grants such permission, the PPC forms a tunnel between the operating PC and the requesting MMS by repeating the frames transmitted from either network component to the other. The PPC also sends a beacon for the use by the requesting MMS. This beacon will have all the information from the beacon of the operating PC with the CF parameters appropriately adjusted to simulate a CFP within an existing CFP.

Even when there is a PPC operating, all the MMS are required to register with the PC whenever possible. Only in the cases where the PC cannot receive transmissions from an MMS or an MMS cannot receive transmissions from the PC, should an MMS try to register with a PPC. The beacons from a PC and any PPCs can be clearly differentiated by the CF parameters contained therein. The CF parameters in a beacon from a PPC indicate a CFP contained within the duration indicated by the CF parameters in a beacon from the PC. Though an MMS can be allocated transmission bandwidth from either PC or a PPC, but not both, it can receive frames at all times. This enables an MMS to receive from a device during the CFP of the PC and transmit during the CFP of a PPC or vice-versa. All the transmissions managed by PC or a PPC should use the same BBSS-SID and operate as defined in the 802.11 standard.

2.5 Peer-to-Peer Connections Between Stations During Contention Free Periods

In one embodiment, the present protocol provides definitions for extensions to allow any two stations to request transmission time during CFP and transfer data amongst themselves. This limits the burden on the PC to granting such transmission time and providing the beacon service avoiding the bandwidth overhead of the PC having to repeat the data for the actual destination station. The peer-to-peer connection extensions will be defined below.

3 Hierarchical Structure of Transmitted Data

Figure 3:
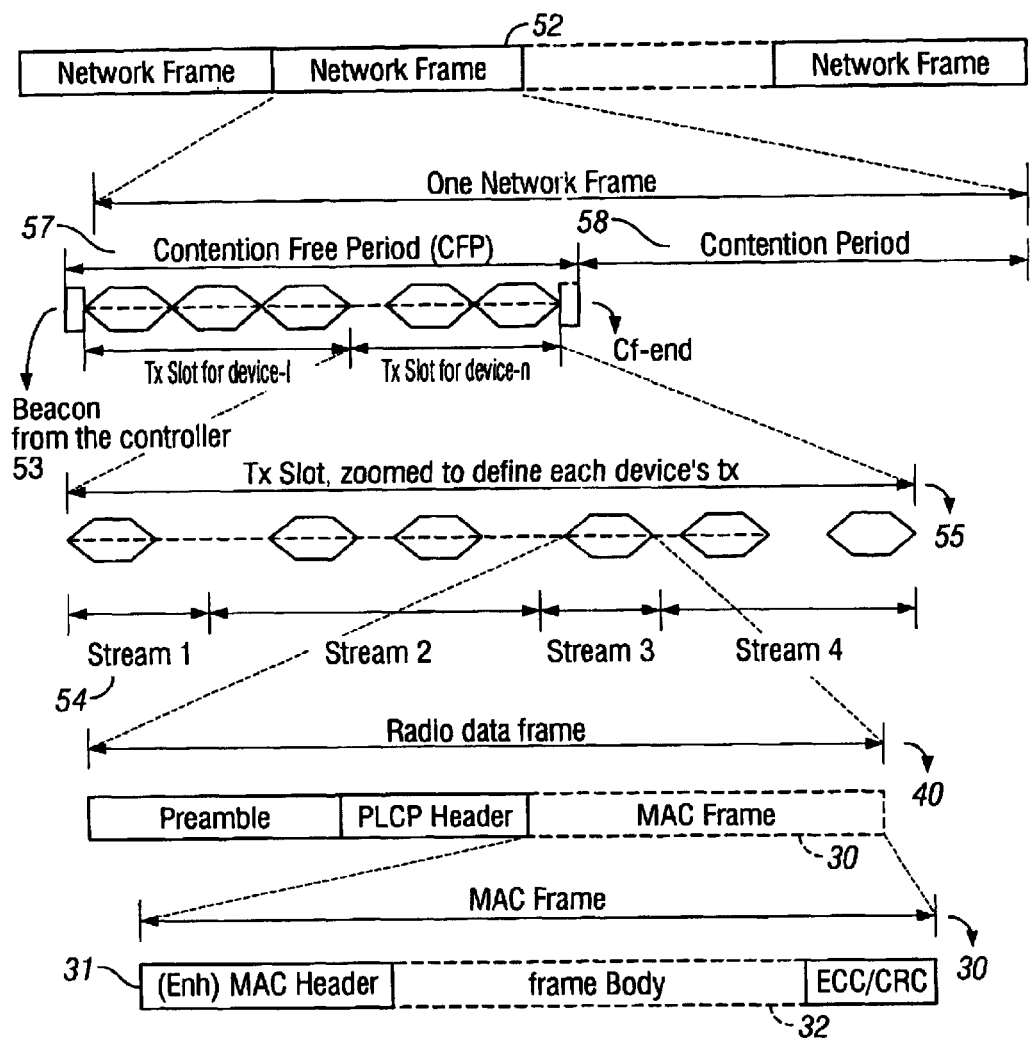
FIG. 3 illustrates an example of a transmission hierarchy in a multimedia enhanced network according to one embodiment of the present invention.

Transmitted data has four layered structures in the hierarchy as shown in FIG. 3. Each network frame 52 has transmissions from a PC and client devices arranged in a timeshared fashion. Each device's transmission contains one or more streams 54 (audio, video, and data streams) and one command (virtual) channel. Each device's slot 55 is time divided for different classes of data. Radio data frames 44 are of variable length and contain the PC/client data MAC frames 30, which in turn are of variable length. Each network frame 52 is divided into a contention free period (CFP) 57 and a contention period (CP) 58. The CFP 57 in each network frame 52 is divided into several slots 55, each slot 55 being for transmissions by a multimedia-enabled device (MMS). Each device and the PC dynamically negotiate the duration of these slots 55 so as to achieve the best possible bandwidth utilization. The bandwidth is negotiated with the PC by the transmitting device. The PC maintains a dynamic table consisting of all the bandwidth allocations. This information is used in deciding connection to a new client. The connection type (isochronous or non-isochronous) and the required min/max bandwidth are negotiated during the creation of the stream 54.

Each device's transmission contains MAC frames 30 (shown in FIG. 4) intended for different devices in a sequential order. Groups of frames for each device constitute a stream-like command, voice audio, video and data, etc. These streams 54 are also referred to as the virtual channels or virtual streams in this description. The duration of a network frame 52 and the duration of each transmission slot 55 is set by the PC based on the Quality of Service (QoS) requests from the client devices so as to achieve the best possible bandwidth utilization with optimal latency in the delivery.

3.1 Enhancements to Contention Free Period (CFP)

The basic definition of a contention period 58 and CFP 57 set forth in the 802.11 standard does not change with this scheme. However, to simplify netowrk operations, preserve precious bandwidth and achieve the required TDM operation this Scheme elimates the poll+data+ack nature of transmissions during a CFP 57. All MMSs are required to send only the multimedia frames during their allocated time period within each CFP 57 periodically. Hence the following are required from the MMS/PC during a CFP 57;

An MMS/PC does not send or expect MAC-level acknowledgements to any frame received during the CFP as this can disrupt the TDM operation of the network during the CFP.

Acknowledgements to the frames during the CFP are sent or expected only as an MM-command once per network frame from an MMS/PC.

An MMS is not allowed to send any non-MM frames during a CFP. Instead, such communications are limited to the contention periods within each network frame.

MMS/PC can send MM frames to another MMS/PC during contention periods expecting the MAC-level acknowledgements starting within SIFS similar to the acknowledgements currently defined for control, data and management frames.

3.2 Rules on Use of Beacons For CFP by MMS and PC

The use of beacons for CFP 57 in the present scheme is similar to that defined in the 802.11 standard, with the following enhancements.

The PC should indicate the next channel it intends to use in the channel field. This can be used by any overlapping BSSs to occupy the current channel after the current BSS moves over to a new channel.

All the MMSs and PPCs make use of the beacon information after verifying the BBSS-SID contained in the beacon. The beacon period indicated by the CF parameters in the beacon from the PC are used, so that if a beacon is lost because of channel corruption, network components still operate using the periodicity indicated by the previously received beacon. A PPC within one network is clearly distinguished from a PC of another network operating within the CFP of the same PC by the differences in their BSS-SID and BBSS-SIDs.

NAV settings upon reception of a beacon by all non-MMSs are same as those defined in the 802.11 specification.

All MMSs strictly adhere to the negotiations and agreed upon transmission times within a CFP. They transmit only during the allocated transmission slots 55 within the CFP and have the freedom to contest for the time during a contention period 58. Additionally, all MMSs must make use of the guaranteed repetition of the beacon, whose period is provided by the PC during the association.

The PC should send the beacon with an appropriate beacon interval. The TBTT is set such that the actual beacon is trasmitted after a delay of (2*DIFS+RTS+CTS+3*SIFS+MaxData+Ack) from the start of the CFP. This allows a non-MMS to have started its transmission just before the start of the CFP and still not affect the time of the beacon transmission. However, MMSs know the actual start time of the beacon transmission and hence can make use of this period before the beacon, if available, for connection establishment purposes.

The PC monitors the channel and recognizes the frames from STAs with the Duration field set to exceed the NAV beyond the actual transmission of the beacon by the PC. If such a frame is detected during the CFP before the beacon, then the PC sends out a short dummy frame during the period of acknowledgement to that frame. This corrupts the acknowledgement frame, forcing the STA to back off the channel. This mechanism, along with the above-proposed delay, guarantees the availability of channel time for a CFP at the period that the PC indicates in the beacon as the beacon interval.

As the CFP is dynamically adjusted by the PC to optimize channel throughput and is exact to the requirement of the TDM transmissions, there is no need to send a CF-end message by the PC to indicate the premature end of a CFP.

3.3 Opportunistic Use of Unused Bandwidth

The first and last multimedia frames transmitted by an MMS during its CFP transmission slot 55 must contain such first or last frame indication in its MAC header 31 for other devices to be able to recognize them. If a device receives the last frame from the device preceding it in the CFP transmission list, then said device can prematurely start transmitting in the leftover time. This feature provides the opportunity to maximize the use of bandwidth during CFP operation whenever a device runs out of data before the end of its assigned TX-slot.

When multiple non-consecutive transmissions are allowed for one device, there is a possibility that more than one different devices follow said device after each of its TX-slots. Hence, to prevent such following devices from beginning early transmissions at the same time, the "last frame" time window of observation must be limited. This time window should start only after the last frame from the device transmitting one TX-slot prior to each device's preceding TX-slot.

4 MAC Frames 4.1 MAC Frame Types and Subtypes

The currently reserved frame type '11' (binary) is used for multimedia (MM) frames. The MM frame type has two subtypes, MM-data and MM-Command. The MM-data subtype is used to transport the data in streams. MM-Command subtype is used to communicate the management commands defined in a later section of this description.

4.2 MM Frame Structure

Figure 4:
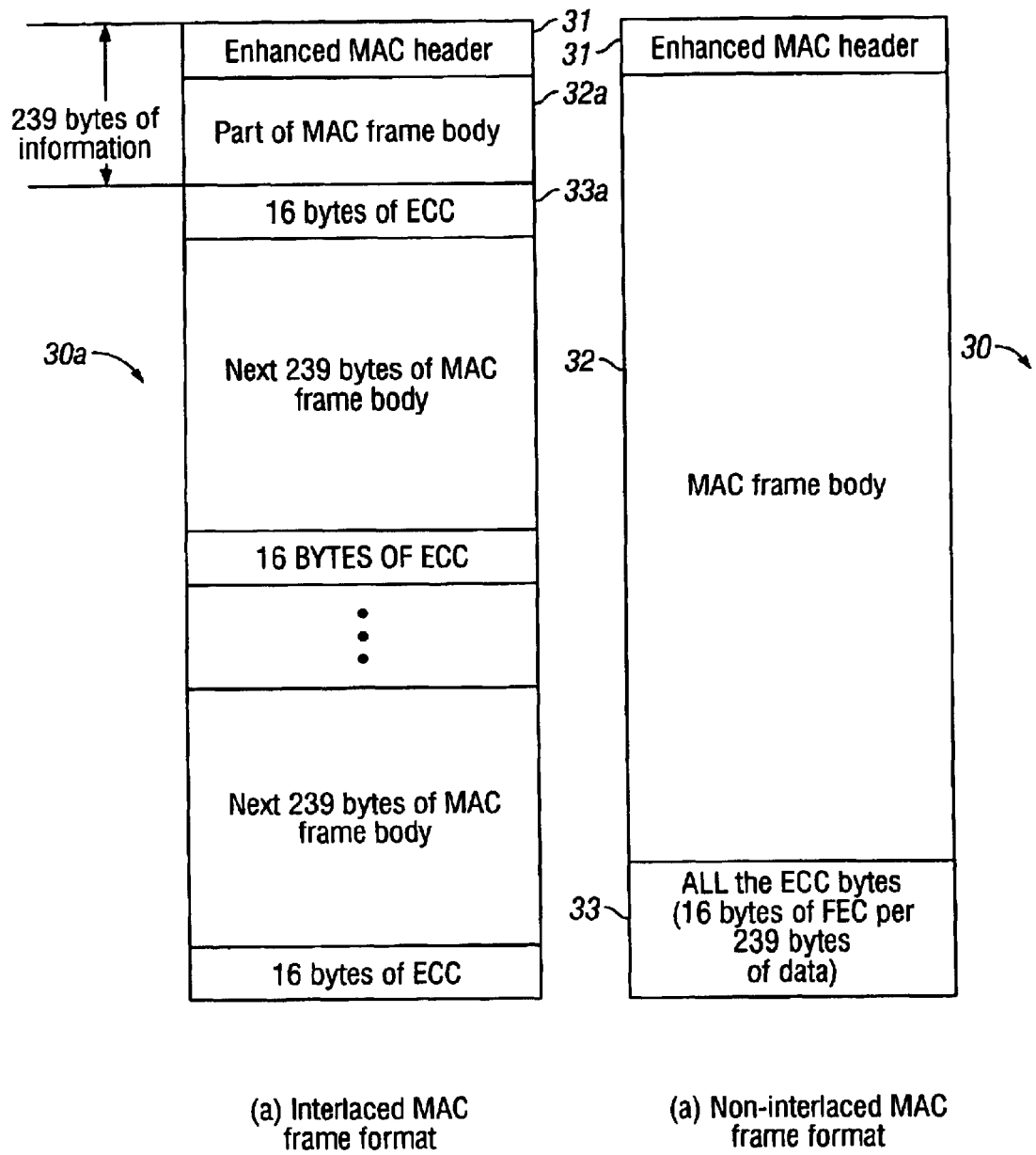
FIG. 4 illustrates an example of a multimedia enhanced MAC frame format according to one embodiment of the present invention.

As depicted in FIG. 4, MM frames 30 have three main parts; the header 31, the payload or body 32 and the ECC 33. There are two proposed frame formats depending on the way ECC bytes are transmitted.

4.3 MAC Header Structure

Figure 5:
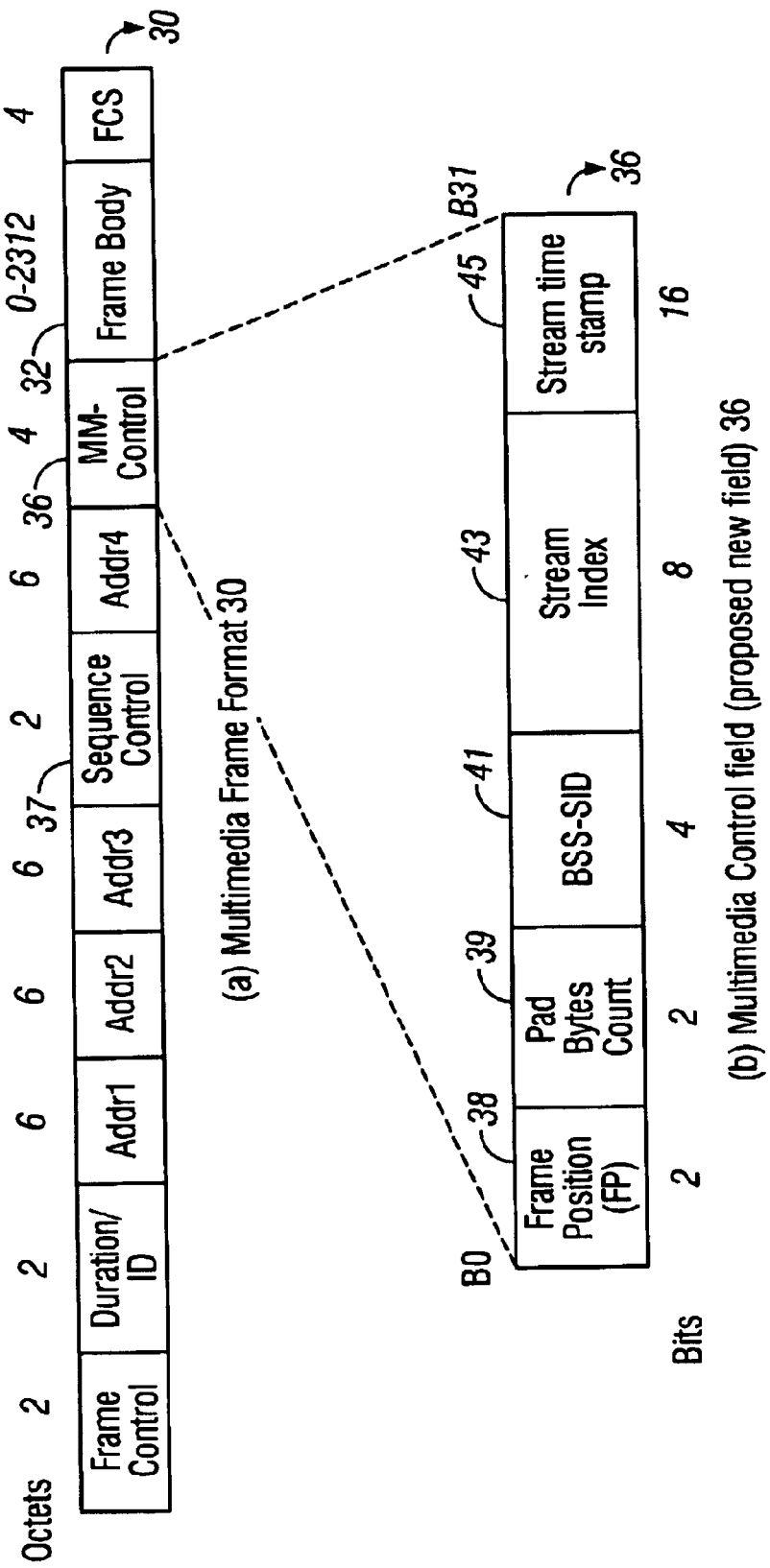
FIG. 5 illustrates an example of a multimedia enhanced MAC frame header format according to one embodiment of the present invention.

In one embodiment, the MAC frame header 31 is defined having a new field called MM-control field 36 which is four bytes long. The various fields in the header 31 and the sub-fields of the MM-control field 36 are shown in FIG. 5. These fields and their usage are discussed in the following sections. The sequence control field 37 in the enhanced header 31 is used as "stream sequence control". That means that every stream transported with this header format must have an independent sequence number (independent of other traffic in the BSS).

4.3.1 Frame Position (FP, 2 Bits)

In the present embodiment, the frame position field (FP) 38 is two bits long and indicates the position of the frame, within the TX-slot. The least significant (LS) bit is used to indicate whether the current frame is the first frame and the most significant bit (MS) is used to indicate the last frame.

Setting both of these bits to logic low (00) is used otherwise.

4.3.2 Pad Bytes Count (PBC, 2 Bits)

This embodiment defines a Pad bytes count sub-field 39 that indicates how many bytes are padded in a frame to make the entire frame DWORD (4 bytes) aligned. This sub-field helps easing the hardware implementation of the MACs by working with DWORD aligned frames instead of byte aligned frames. At the transmitter, the MAC hardware is expected to pad bytes at the end of the frame after the FCS field and report the count in this sub-field. At the receiver, this information is used to determine the correct length of the frame throw away the padded bytes.

4.3.3 BSS Session ID (BSS-SID, 3 bits)

The BSS-SID sub-field 41 comes to use when overlapping subnets needs to operate in the same channel. In the present embodiment, this field allows up to 16 overlapping subnets to share the same channel as described below.

4.3.4 Stream Index

The 8 bit stream index sub-field 43 is used in conjunction with the MAC addresses of the originating device to uniquely identify a data stream. A device can generate or consume up to 255 streams from each of the other devices in the network. All the values of stream index are dynamically assigned and used.

4.3.5 Stream Time Stamp

In the present embodiment, the 16 bit stream Time Stamp sub-field 45 is used to provide support for synchronization of any two streams originating from a device. The contents of this sub-field are multiplied with 1024 microseconds (TU) to obtain the actual time. Details on the use of this sub-field are described later in this description.

4.4 Frame Body

For stream types like voice, audio, video and data, the MAC frame body 32 contains the information (data) bytes. For the command frames, the body contains a chain of commands and subcommands.

4.4.1 Structure of Command Frame Body

Figure 6:
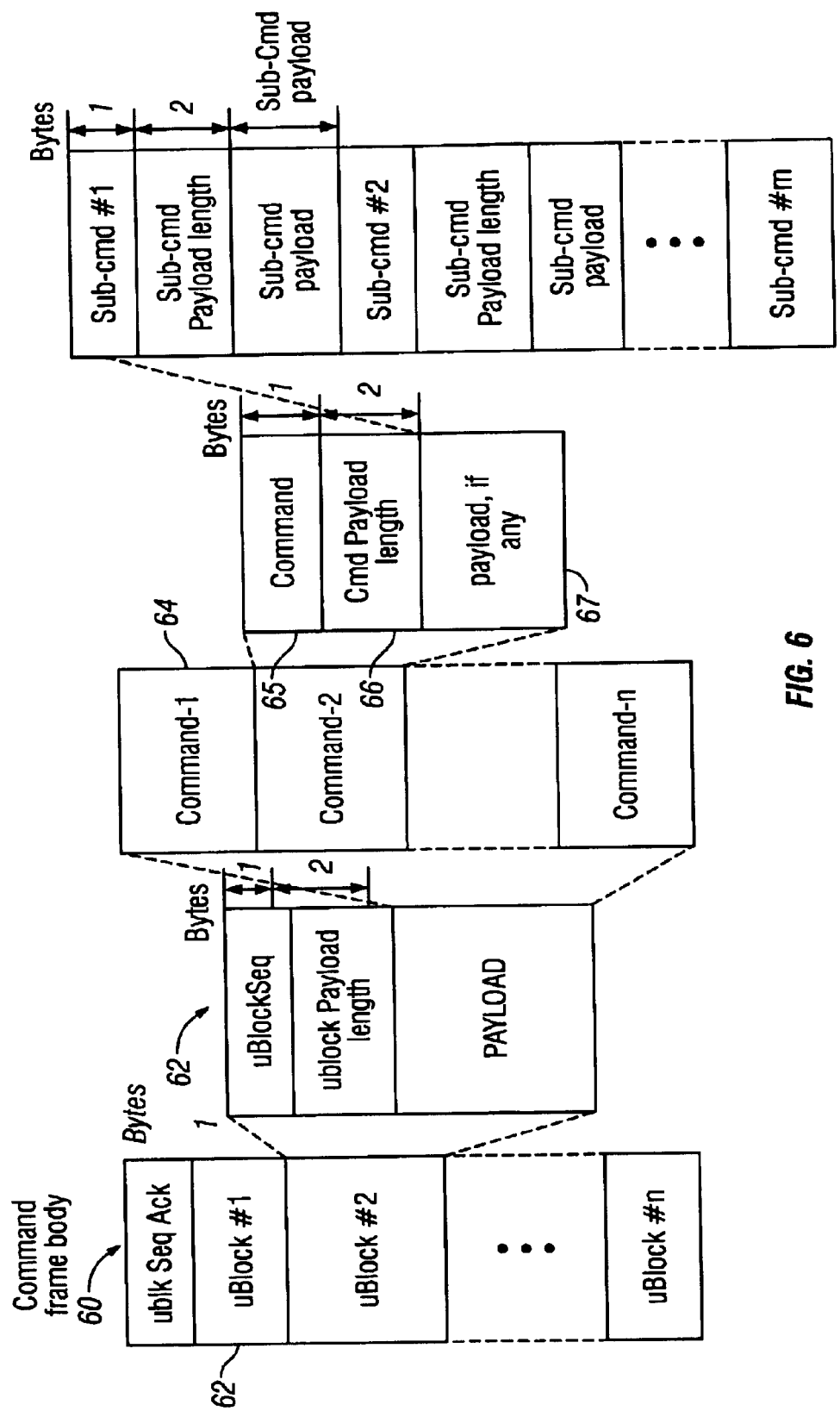
FIG. 6 illustrates an example of a structure of a unicast command frame according to one embodiment of the present invention.

Shown in FIG. 6, a command frame body 60 can have either the unicast or the broadcast format depending on the destination address in the MAC frame header 31. If a device is going to send a command frame to another specific device, it can use the unicast format. This same format can also be used to send one command frame with several command blocks 62 within that frame. Any number of commands 64 can be chained together within a unicast command frame or a command block in a broadcast command frame. However, this concatenation of commands is limited by the allowed maximum size of a MAC frame. The commands used for the network operation are defined in a later section.

Figure 7:
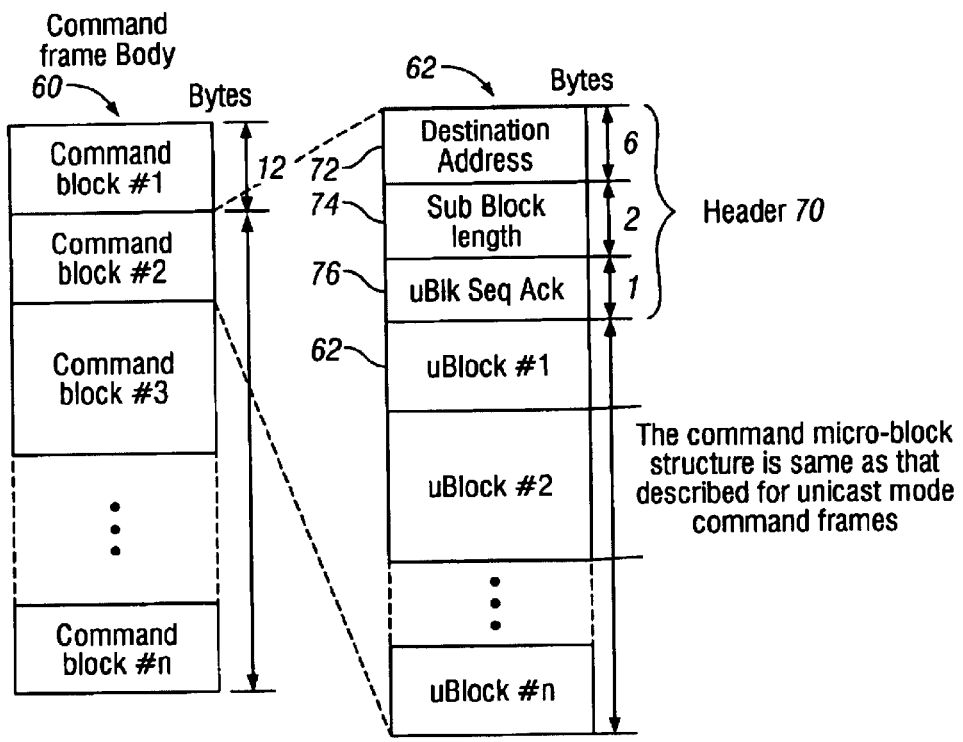
FIG. 7 illustrates an example of a structure of broadcast command frame including command blocks, commands, and sub-commands, according to one embodiment of the present invention.

In the one embodiment, each command block, as depicted in FIG. 7, consists of a header 70 with three fields and several micro-blocks 62. The command block header 70 contains a destination address 72, the block is length 74 and a sequence number 76 for the micro-block that was received last from the specified destination address 72. Each micro-block 62 has a chain of commands 64. Each command 64 consists of a command description 65, a command payload length 66 and the command is payload 67 itself. The unicast frames do not have command blocks 62 but have the header 70 containing the sequence number 76 of the micro-block that was received last from the specified destination address. The command micro blocks 62 that are same as described above. The command micro-block 62 is given an increasing sequence number that is specific to a destination address.

4.4.1.1 Unicast Command Frame Body Structure

In unicast command frames, the command frame body 60 contains a series of commands 64 with a command description 65 that is followed by the associated command payload 67 destined for one device. The structure of the unicast command frame body is shown in FIG. 6. As the entire command frame is meant for one destination device, the number of command frames that needs to be sent out from each device is equal to the number of destination devices it is communicating to. If a command does not have any subcommand specified, the payload must contain the bytes corresponding to the command without any subcommand structure inside.

4.4.1.2 Broadcast Command Frame Structure

In broadcast command frames, the command frame body 60 contains series of command blocks 62 as shown in FIG. 7. Each device can compile all the commands 64 intended for a destination device into a command block. All the command blocks can be combined into one frame which can be transmitted as a broadcast frame.

4.4.1.3 Reliability of the Command Frames

Achieving reliability in the transport of commands has two parts. First, the device that receives a command acknowledges the reception in a command packet of its own. Second, the device that sends a command is required to know the command or the boundary that is indicated in the received acknowledgement 76. To achieve this reliability, the commands transmitted for the first time in a command frame are grouped into a micro-block and assigned a sequence number (uBlock Seq). Each subsequent command frame must contain all the micro-blocks that have not been acked or have not timed out. The mirco-blocks should be arranged in the same order as of their first transmission. This sequence is dependent on the acknowledgements from the destination device and hence, each device may have more than one sequence of micro-blocks. The device that receives a command frame must send the sequence number of the last micro-block that it received from the sender as the acknowledgement 76 to the device. The uBlock-Seq-Ack 76 received in a command frame is used to remove those commands from the list of micro-blocks pending for transmission.

4.5 CRC/ECC Field

Each MM frame 30 is protected using selectable an ECC depending on the requested type of channel protection for the corresponding stream. CRC is computed using the IEEE-32 bit CRC polynomial and appended to the MAC frame 30 as similarly to how it is currently defined in the 802.11 standard. The ECC is based on $GF(2^8)$ RS coding. The size of the CRC is 32 bits and the size of the ECC is based on the frame size, the ECC block size (n), the ECC message size (k) and the number of correctable errors ($t_{max}$).

5 New Elements and Frames

5.1 Capability Information in Management Frames

Figure 8:
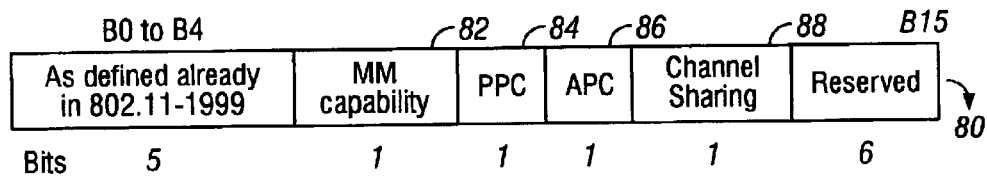
FIG. 8 illustrates an example of a multimedia enhanced capability information field according to one embodiment of the present invention.

In FIG. 8, one embodiment shows capability information contained in a management frame 80 that includes the following one bit information fields:

1) a MM capability bit 82 to indicate whether the device is multimedia enhanced,
2) a PPC capability bit 84 to indicate whether the device can provide proxy services (PPC);
3) an APC capability bit 86 to indicate whether the device can be an alternate PC (APC), and
4) a channel sharing bit 88 to indicate whether the BSS is sharing the channel with other overlapping BSSs.

5.2 DS Parameter Set

The interpretation of the current channel field in the DS parameter set is modified to mean the next channel number. This change is necessary to enable the dynamic channel change feature.

5.3 Additional Elements for Beacon

In addition to the beacon elements included in the 802.11 standard mm-enhanced which must be used in probe and probe response frames, the beacon frames must also have the following information elements.

Figure 9:
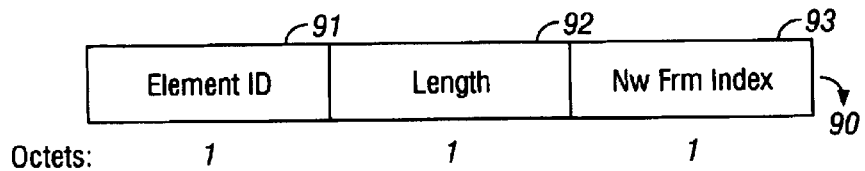
FIG. 9 illustrates an example of an element for network frame index according to one embodiment of the present invention.

First, the beacon must have a network frame index 90, depicted in FIG. 9, with a running network-frame-index-number 93 for the beacons transmitted. This is required for a client device to synchronize with commands like the channel change command. Second, the beacon, must have a generator device property field indicating whether the device is a PPC in a PPC sub-field 102 or an MC in an MC sub-field 104 as shown in FIG. 10. For a PC, the PPC bit 102 will be zero. Third, as shown in FIG. 11, the beacon must have a current-load field 110 indicating the number of associated devices 112, the percentage of bandwidth used in the BSS 114, the number of subnets sharing the same channel 116, and the percentage of bandwidth used in said channel 118.

5.4 New Reason Codes for Disassociation

The new disassociation reason codes are:
1) Serving maximum number of clients;
2) Lack of bandwidth available to serve the client;
3) Channel conditions are too severe;
4) Client is overshooting the allocated transmission time;
5) PC is turning off with no APC in the network;
6) Channel change is in progress;
7) PC hand over is in progress;
8) PPC cannot serve this client anymore. This reason can be used if and only if a PPC currently serves this client; and
9) The client is violating the QoS agreements;

6 Operational Description of Devices in the Network

6.1 PC Operation

The operation of the PC is enhanced to include the responsibilities of Stream Management, dynamic bandwidth allocation, and network synchronization. The PC decides the network parameters depending on the requests from the clients. In associated with its BSS one embodiment these parameters may be, network frame size, number of stream connections, transmission duration of each device, etc. The PC optimizes these parameters for efficient network performance and communicates them to all the devices in the BSS.

6.2 Proxy Point Coordinator (PPC)

A PPC is a client proxying as a point coordinator for devices that have poor reception from the actual PC. The PC selects a device to be the PPC depending on the inputs from the device. The proxy service involves providing time reference through proxy-beacon and command and data relaying between two devices. An example of this operation taking place is when a client's link with the actual PC is poor and the client requests a proxy service from a device with a better link to both, the PC and the requesting client. Another example of this type of proxy operation would be a device requesting command and data relay services for another device in the BSS with whom its link is poor. If the client being served does not see a PPC for a predefined duration, it can request a new PPC connection to some other device. Similarly, if a PPC does not receive from a client for a predefined amount of time, it must inform the PC and withdraw itself from the PPC service to that client.

In one embodiment, the duration allocated for the PPC transmission is simply treated as a TX-slot by the PC, and the duration allocated for a PPC's CFP_Max_duration is determined based on the transmission requests from the individual devices operating within that duration. The PPC is responsible to communicate the bandwidth allocation decisions from the PC to those devices it is servicing.

In summary, although the PC remains in control of permitting the services of the PPC, the PPC must be able to provide the following services:
1) Timing reference for the devices requesting Proxy services;
2) Data relay services between devices. For this purpose the PPC is allowed to modify the From-DS and To-DS bits in the MAC header and insert its own address in the from-DS address field. A device can have one PPC per link that it is connected to, though ideally one PPC for all devices is desired; and
3) Extending the above mechanism, two devices might be connected via more than one PPC.

Figure 12:
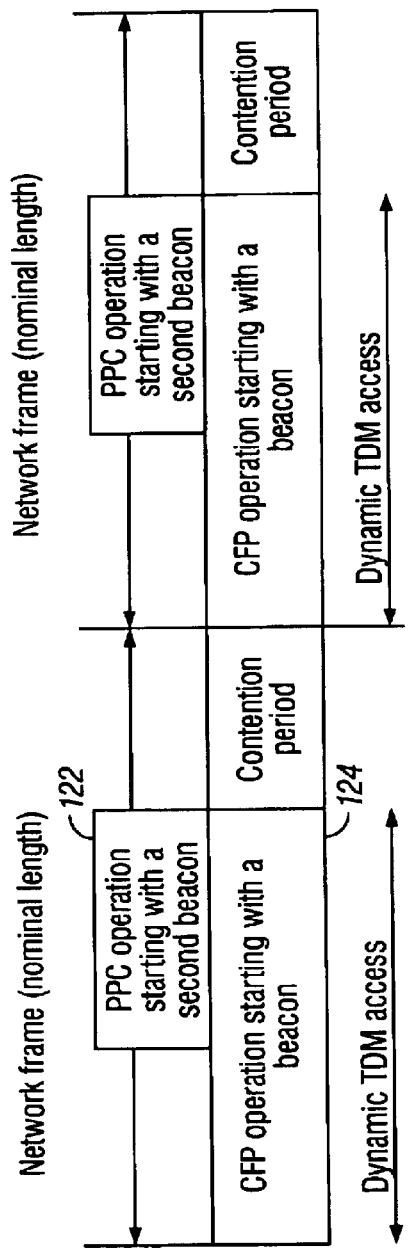
FIG. 12 illustrates an example of the operation of PPC within the network frame of a PC according to one embodiment of the present invention.

The PPC function is depicted in FIG. 12. The PPC's operation 122 is included in the overall PC's CFP operation 124. An MMS operating as a PPC is allocated more than one CFP TX-slot. First it may transmit its own data as an MMS in a first TX-slot and second it may relay the data from one or more other MMSs in subsequent TX-slots operating as a PPC.

6.3 Alternate Point Coordinator (APC)

In any network based on coordinator-client relations, it is very important to consider the factors that can lead to the break-down of the coordinator. Thus this scheme allows a PC to hand over its responsibilities to an APC, if required. For the proper operation of this hand over, all the APCs are kept informed of the network's properties and client devices at all times. If an APC is offline and connects to the network after some time, it either waits for the PC for an update or it can voluntarily request the network status information. If there are multiple devices volunteering to take over the PC responsibility, then they negotiate for the responsibility. The relevant commands that may be used in this operation are discussed in a later section.

7 Network Synchronization

Time synchronization between the PC and the clients is important in any isochronous-date capable network. This scheme achieves synchronization through the exchange of synchronization commands and PC beacons 53. The parameters used to achieve network synchronization are:
1) network frame 52 size;
2) wait time for each device 132;
3) transmission slot 55 duration for each device; and
4) identity of the preceding client.

Figure 13:
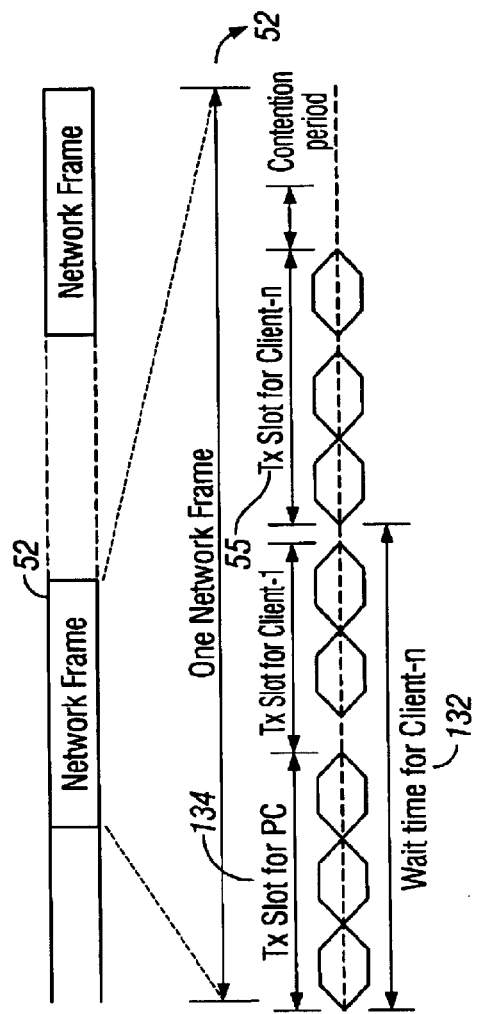
FIG. 13 illustrates an example of a transmission sequence in a network frame according to one embodiment of the present invention.

These parameters are depicted in FIG. 13 and the times are in units of micros seconds. For simplicity, all the CF-polled transmissions, currently defined in the 802.11-PCF, are included in the TX-slot for the PC 134. Table 2 further exemplifies the TDM style channel sharing by devices in the network during CFP operation.

TABLE 2

| Tx Slot type | PC | Client-1 | Client-2 | Client-3 | ... | Client-N | DCF mode devices |
|---|---|---|---|---|---|---|---|
| $S_0$ | Tx | Rx | Rx | Rx | Rx | Rx | Rx |
| $S_1$ | Rx | Tx | Rx | Rx | Rx | Rx | Rx |
| $S_2$ | Rx | Rx | Tx | Rx | Rx | Rx | Rx |
| ... | ... | ... | ... | ... | ... ... | ... |
| $S_N$ | Rx | Rx | Rx | Rx | Rx | Tx | Rx |
| CP | Rx | Rx | Rx | Rx | Rx | Rx | Tx |

The network frame 52 size is the time between two beacon 53 transmissions from the PC. This parameter is decided based on the number of online clients, their bandwidth, and their latency requirements. The wait time 132 is the time for which a device has to wait after receiving the beacon 53 from the PC and before it can start transmitting. The transmission slot 55 is the allocated transmission duration for each device in the PC's local subnet (BSS).

7.1 Beacon From The Point Coordinator

As in the known PCF operation, in the present scheme a PCF beacon 53 is periodically sent from the PC to its client devices as a time reference. The devices depending on proxy coordinators use the proxy beacons for time reference.

7.2 Network Slot Synchronization

As part of stream management negotiations the PC provides each client with the network synchronization parameters discussed in the earlier section. The clients honor this agreement by waiting and starting transmission at the allocated. While waiting, if a device detects the end of transmission indication from the preceding device, then it immediately starts its own transmission. The end of transmission is detected when the preceding client sends a MAC frame marked as the last MAC frame. The extra bandwidth, if any, detected by the current client device can be used of to send its queued up data. For example, if a client is supposed to wait for 20 msec and it detects the last MAC frame from the preceding client within 15 msec, then it can use the extra 5 msec. Due to high MAC frame losses in wireless channels accurate wait times are necessary in starting the transmission from a device. If necessary, PC can indicate the broadcast address in the previous client Identification field restricting the client from using such left over bandwidth. Additionally the clients themselves may not use extra bandwidth if there are strict timing restrictions on their transmissions.

7.3 Time Synchronization of Action to PC's Decisions

The PC has the responsibility of taking decisions on the above listed synchronization parameters and the change of channel operation. However, a more important responsibility that comes with the of decision-making is conveying the decision information to all the devices in the subnet and synchronizing their action to such decisions. One example is the time synchronization to use new network synchronization parameters. The PC achieves this operation by informing of the decision to all clients, typically in a broadcast message, and sending along the number of network frames to wait before making the new decision effective. Additionally, the PC might repeat the decision in many successive network frames. Whenever such repetitions are made, the time to wait is appropriately reduced. With this scheme, even if a device did not receive first few transmissions and receive the same later, it will wait until exactly the same time event as the other devices before adopting the new parameters.

7.4 Variable Network Frame Size

The PC dynamically decides the network frame 52 size and communicates that information to all the client devices in the subnet before the change takes place. The network frame size is decided based on the number of client network components that are currently online and the latency requirements of their streams. When there are many client network components, the network frame should be longer. Conversely, if there are fewer network components low latency requirements on their streams, then the network frame can be shorter.

7.5 Multiple Transmissions by a Network Component

Whenever the network frame duration cannot be shortened due to the number of associated MMSs, an MMS requesting lower latency on an ongoing isochronous stream is allowed to transmit in more than one non-consecutive slot. The association agreements would specify the number of slots, and the parameters for each slot. This mechanism may be essential in some situations, for example when one device is transporting a Voice Over IP (VoIP) stream to one MMS while transporting a DVD-video stream to another MMS in the same network frame. The PC, depending upon the latency requested, ultimately decides the number of non-consecutive slots per frame it can grant to any given device.

7.6 Synchronization When Multiple Overlapping BSSs Share the Same Channel

When multiple overlapping BSSs are sharing the same physical channel, the synchronization parameters required, and their usage, are very similar to the description above. The parameters are, the network frame size 52, the wait time for each PC/BSS 132, the transmission slot duration for each BSS 55, the address of the PC of preceding BSS, and the corresponding BSS-SID. The wait time at PC-level meant for beacon transmission is strictly enforced to avoid any confusion in the network hence no bandwidth optimization is allowed between BSSS. These wait times are always measured from the initial synchronization beacon transmitted by the master-coordinator (MS). This forms two-stage wait times, where each PC waits for certain length of time from the beacon of master coordinator and the MMSs within each BSS wait for their pre-negotiated TX-slot a certain amount of time from the beacon of their associated PC.

8 Streams and Quality of Service

This scheme provides the necessary mechanisms at the MAC layer for all the services necessary to transfer multimedia data. Applications, such as, VoIP and live video streaming generate isochronous data that needs a low latency network protocol with end-to-end QoS to function. The use of the virtual stream concept simplifies the task of providing QoS for such data. In one embodiment, this scheme supports the ability of a PC to specify and control the bandwidth of each stream and the rate of each stream that is necessary to deliver the guaranteed bandwidth requirements.

8.1 Data Streams

Each network component can be transmitting a set of data streams and can be consuming another set of data streams. For every data stream generation and consumption, the component must obtain permission from the PC and negotiate the network bandwidth for the same. The PC grants such requests depending on the available resources. The client network components can dynamically connect and disconnect any stream and can renegotiate the bandwidth for an existing stream on an on-going basis.

Figure 14:
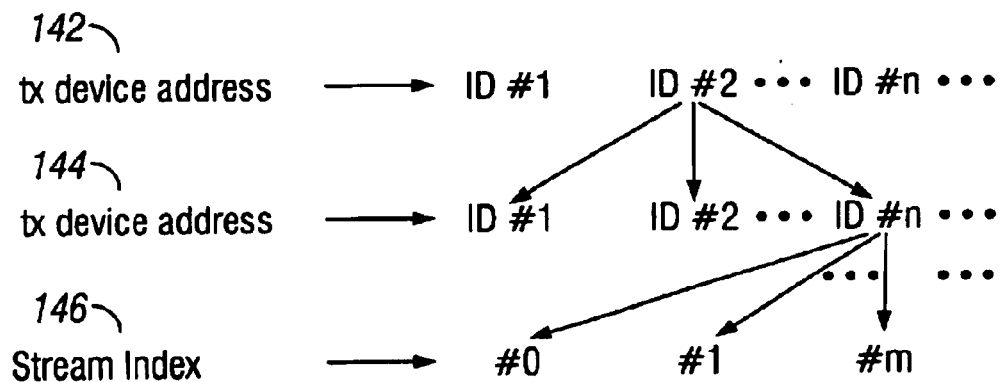
FIG. 14 illustrates an example of a data stream hierarchy in a multimedia-enhanced network according to one embodiment of the present invention.

The hierarchy corresponding to the data streams is as shown in FIG. 14. Any two data streams on the network can be distinctly identified based on the TX device address 142, the RX device address 144 and the stream index 146 that are sent with each MAC frame. Each of these streams can be negotiated with different QoS parameters. The PC maintains the QoS and user list for each data stream and shares that information with all the users of that data stream.

8.2 Stream Management: Stream Connection, Distribution and Disconnection

Figure 15:
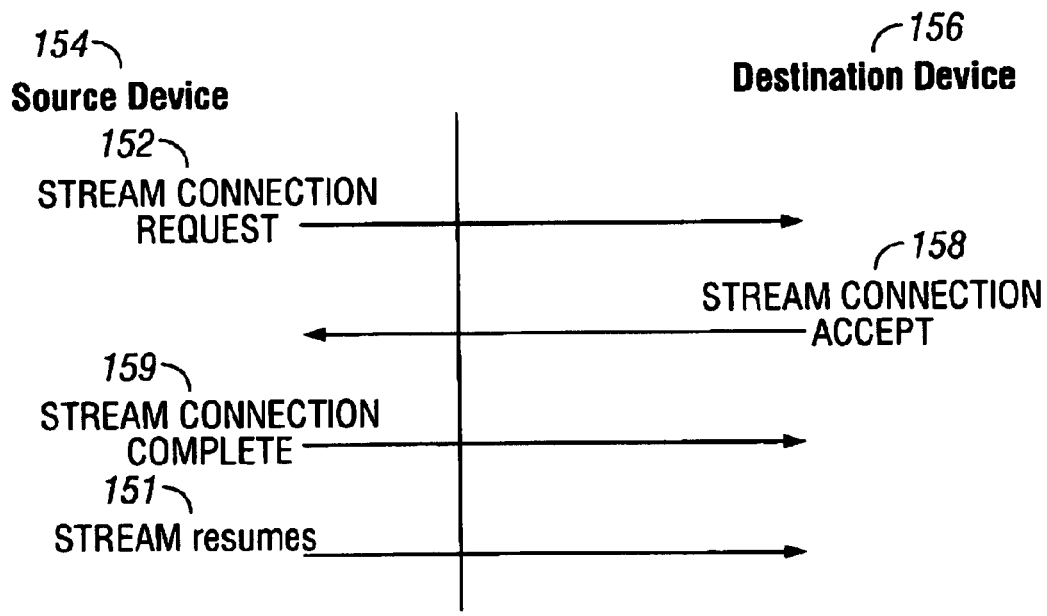
FIG. 15 illustrates an example of a stream connection process according to one embodiment of the present invention.

Each stream needs to be connected when it is needed and disconnected when it is not needed any more. The only exception to this is the basic command channel from each QoS enabled device. There are two end-point-IDs that are used during the stream connection: the Listen End-Point ID (LEP-ID) and the Requester End-Point ID (REP-ID). A set of Listen End-Point identifiers (16 bit) are defined so that a network component requesting a stream connection can do so with the correct End-Point at the destination network component. The REP-ID is dynamically assigned to be unique for each stream connection and is exchanged with the other network component using the stream management commands that are defined later in this description. As shown in FIG. 15, the stream connection request 152 must contain the requester's End-Point ID for the stream and the Listen End-Point ID at the destination. Some of the defined Listen End-Point ID are:
- 0–1->Reserved
- 2->Audio
- 3->Video
- 4->Voice
- 5->asynchronous data
- 6->Real time data (like Time)
- 7–64k are reserved The connection, distribution and disconnection processes are described in the following sections.

8.2.1 Stream Connection and Distribution

Each network component is responsible for setting up and tearing down all the streams that it sources. In one embodiment of the present invention, the PC keeps track of bandwidth allocation. Hence, for a stream connection between any two network components, the PC needs to be informed of the stream connection status and characteristics. Two possible approaches are:
1) Forward every connection setup request to the PC and have the PC node establish the stream connections between the clients; or
2) Have the client initiating a stream connection coordinate with the PC and its peer device to setup the connection.

The drawback of the first approach is that the stream connection establishment time would be prolonged and that unnecessary additional load is imposed on the PC. The second approach has the advantage of decentralization of the stream connection responsibility to the device that needs the stream connection. The PC is only involved at the stage of authorization and bandwidth allocation for the connection.

A stream is unidirectional and the two ends of the stream are referred to as the source (Tx) and destination (Rx) devices in this section. When the stream connection is established, as shown in FIG. 15, a stream index gets allocated for that stream, which is used for handling the MAC frames. The source device 154 sends a stream connection request 152 to a destination device 156. Such destination device acknowledges the request by transmitting back a stream connection accept 158 which is also acknowledged by the source device 154 who finalizes the negotiations with a stream connection complete 159 message and initiates the stream transmission 151. The connection setup process also allows for the creation of a bi-directional connection, which essentially results in the creation of two such streams, one in each direction.

In multicast streaming, the multicast clients get permission to consume the multicast stream from the PC. The source device needs to collect retransmission requests from all the destination devices for that stream and decide the MAC frames that need to be retransmitted.

8.2.2 Stream Disconnection

Figure 16:
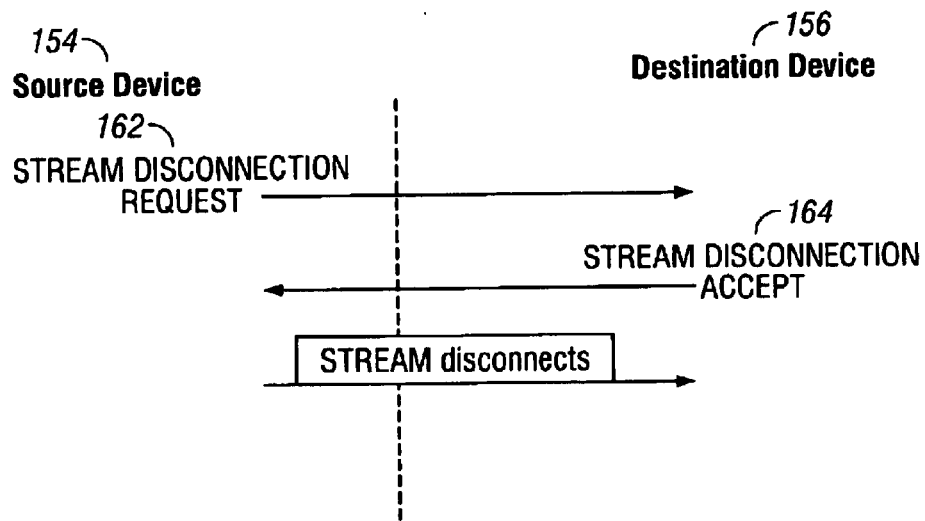
FIG. 16 illustrates an example of a stream disconnection process according to one embodiment of the present invention.

Whenever a stream needs to be disconnected, either the source device 154 or the destination device 156 can initiate such a request. An example of a stream disconnection process is shown in FIG. 16 where the source device 154 is assumed to be initiating the disconnection by transmitting a stream disconnection request 162. In this case, the destination device 156 responds with a stream disconnection accept 164 message and the stream is disconnected. In multicast streaming, if a destination device 156 initiates such a request, the PC simply withdraws the devices permission to consume that particular data stream.

8.3 Support for Stream Synchronization

Stream synchronization is defined as the process of restoring temporal relationships between various streams or elements that compose the multimedia information. The MAC layer assists in stream synchronization by providing stream sequence number and the stream time stamp in the header. At the RX side the MAC supplies this information to the upper layers.

8.4 Stream Priorities and Dynamic Bandwidth Management

This scheme describes four types of streams to be supported along with the current best effort priority: isochronous (2 priorities) and non-isochronous (2 priorities). The priority of a stream is taken into consideration when a PC allocates bandwidth and when the frames are transmitted by TX-devices.

Every network component in the subnet can dynamically negotiate the required bandwidth with the PC. This is necessary when accommodating streams whose characteristics can change during transmission or when channel conditions change due to external factors such as interference. The PC keeps track of all the bandwidth allocations. If a network component requests bandwidth that is more than the available, then the PC indicates how much the bandwidth is available to the network component. If it is sufficient for the network component to initiate its transmission, it accepts it and the bandwidth is allocated. The actual algorithm employed in the dynamically allocation of bandwidth can vary across implementations.

Each client network component must collect the required bandwidth for each of its streams and provide that information to the PC. The bandwidth requirement is divided according to the priorities of the streams. The bandwidth changes are decided by the PC and indicated to the netork components. These changes can happen due to several reasons. For example, whenever a new stream is being admitted, if an existing stream is being terminated, if another BSS starts sharing the channel or due to changes in stream characteristics that might be carried out periodically.

If at any time the required bandwidth is more than the available bandwidth, the bandwidth allocation is readjusted according to the priority of the stream. Within each of the stream priority level, the bandwidth is allocated as per the following order of priority.
1. Device with (overall) lowest bandwidth
2. Device with lowest bandwidth for the current priority
3. Device sending the request first (first-come-first served policy).

For this purpose the PC maintains a table listing the available bandwidth, the allocated bandwidth for each stream priority at every client network component, the requested bandwidth for each stream priority at every network component, and the time of request as shown in Table 3. For bandwidth allocation purposes, the requirements of the PC are treated in the same way as requests from other devices. However, the PC and PPC devices can make use of more bandwidth for management purposes.

TABLE 3

|  |  | Allocated bandwidth | Required Bandwidth | Time of Request |
|---|---|---|---|---|
| Device 0 (PC) | Isoch-1 | 0.5 Mbs | 0.7 Mbps | . . . |
|  | Isoch-2 | . . . | . . . | . . . |
|  | Non-Isoch-1 | . . . | . . . |  |
|  | Non-Isoch-2 | . . . |  |  |
| Device - 1 | Isoch-1 | . . . |  |  |
|  | Isoch-2 | . . . |  |  |

TABLE 3-continued

|  | Allocated bandwidth | Required Bandwidth | Time of Request |
|---|---|---|---|
| Non-Isoch-1 | ... |  |  |
| Non-Isoch-2 | ... |  |  |
| ... | ... | ... | ... |

8.4.1 Bandwidth Monitoring/Policing

The PC is required to monitor the transmissions during the CFP by all MMSs and take action if they do not conform to the agreed upon transmission duration. If an MMS is consistently under utilizing the allocated bandwidth, especially the isochronous bandwidth, the PC can renegotiate that extra bandwidth and allocate it to other MMSs.

Transmissions by an MMS beyond the agreed upon end of transmission time is strictly prohibited during the CFP. If the PC observes such a behavior, it can disassociate the network component violating the agreement. For this purpose, a new reason code is defined for the disassociation of an MMS by the PC as described above.

8.5 Non-Stream Based Data

In any network there are always some data packets that need not be related to any of the stream. Examples of this are an ARP packet from IP/IPX based network and one-time management packets. A stream index of zero is reserved for such asynchronous data frames that do not need any consistent QoS parameters. Hence there is no connection, disconnection or QoS negotiations for streams with an all zero stream index. Any network component can use this all zero D and send non-stream based data. This stream is given the lowest priority in the network and retransmission parameters are set so as to provide very high number retransmissions.

8.6 Guaranteed Limit on Maximum Latency

Maintaining low latencies is a challenge when transporting multimedia data types. This scheme aims at guaranteeing the requested limit on the maximum latency through the following measures. First, the retransmission attempts for a MAC frame in any stream are strictly bounded by the latency requirements. Second, the invention allows a stream to be transmitted more than once within a network frame. A network component can request low latency for a stream in a long network frame and it is permitted to transmit its MAC frames frequently in the time slots appropriately arranged within a network frame. Third, depending on the latency requirements the network frame is adjusted to allow frequent (or slower) transmissions of a stream. Nevertheless, the network frame size adjustments are carried out taking into account the latency requirements of all the streams.

8.7 Channel Protection

The channel losses could result in unacceptable quality of multimedia streams, like audio and video. It could even prevent the receive device from using the stream for a duration much longer than the channel loss duration. To avoid such situations, this scheme supports Forward Error Correction (ECC) coding along with the Cyclic Redundancy Check (CRC) mechanism. Each receiving device can request a specified ECC and a CRC for each stream. With ECC, the isochronous streams become much more usable even under severe wireless channel conditions. The supported ECC scheme is based on Reed Solomon coding with variable protection capability. The ECC is applied to all streams of all priorities depending on the negotiations made during the stream connection establishment.

8.7.1 Error Correction Scheme

In one embodiment of the invention, it is proposed to use (n, k) Reed-Solomon coder over $GF(2^8)$ is defined, however other error correction schemes may be used. The 'n' and 'k', vary depending on the RF channel condition and negotiated QoS parameters for a particular class of data. Each MAC frame (including the header) is split into blocks of 'k' symbols (each symbol is a byte) and the ECC is carried out to form 'n' byte blocks. If the number of bytes in a data MAC frame is not integer multiple of 239, then the last block is sent with a truncated ECC using the virtual zeros technique. In this technique, the ECC bytes are computed as if the data was padded with zero bytes to complete a block, but the pad bytes are not transmitted. Instead at the receiver, the pad bytes are added and then the data is decoded. It is possible to add new types of ECC in the future through negotiations during stream connection establishments. Note that the size of the first block in every MAC frame is always fixed to RS(255, 239). The negotiation of the ECC type applies only from the second block onwards in each MAC frame. Hence RS(n, k) means the second block onwards, the block size is 'n' bytes with information being 'k' bytes unless there is less than 'k' information bytes remaining in the MAC frame. This can happen if the data in the MAC frame is (239+lk+m) bytes where 'l' is an integer (l=0, 1, 2, 3, . . . ) and 'm' is less than 'k'. In one embodiment, the first block of 239 bytes is encoded using RS(255, 239), the next 'l' blocks of data are encoded using RS(n, k) and the last block is encoded using RS(m+k, m).

8.7.2 Retransmission Scheme

The features of the retransmission scheme proposed are, continuous Auto-Repeat-reQuest with Selective Repeat (SR-ARQ), and grouped window based acknowledgements.

The header of the MAC frame in a stream contains an incrementing sequence number and the receiving device responds with an acknowledgement for each sequence number received or missed. The acknowledgements are grouped at the destination client to synchronize them to its own transmit-slot. The acknowledgement is sent as a command in the command frame from the destination client back to the source device. The source device always retransmits the negatively acknowledged frames first before transmitting any new MAC frames. If the ack-command is not received from the destination device, the source device continues to transmit new MAC frames assuming successful reception. The MAC frames that were transmitted in earlier network frames are cleared upon the reception of ack for them or upon the expiration of the retransmission window time. Different commands used for this mechanism are discussed in a later section of this description.

Figure 17:
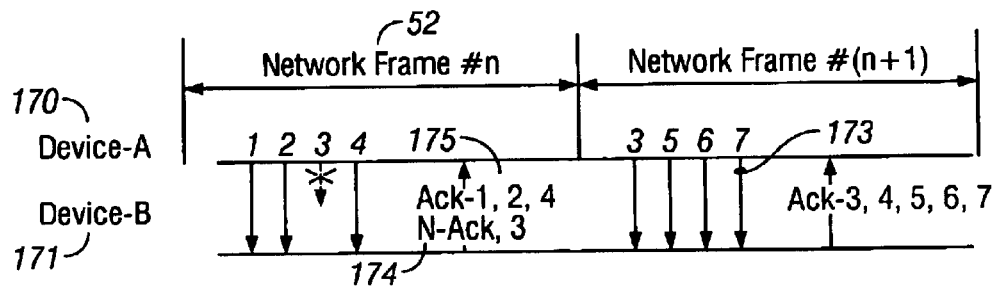
FIG. 17 illustrates an example of a retransmission mechanism—Ack and Nack—according to one embodiment of the present invention.

An example scenario illustrating this retransmission mechanism is shown in FIG. 17. Here device-A 170 is sending MAC frames 173 to device-B 172 where all the MAC frames are assumed to belong to the same stream. In this example, the MAC frame with sequence number 3 is lost in the network Frame #n 52 and hence is negatively acknowledged 174 (Nacked) by device-B. In the next network frame, device-A retransmits MAC frame with sequence number 3 and then transmits some more new MAC frames. The SR-ARQ commands are transmitted continuously in each network frame until the lost MAC frames are recovered or the window of retransmission expires.

8.7.2.1 Acknowledgement Window

The acknowledgement window is a moving window spanning from the first negatively acknowledge (Nacked) MAC frame to the last received MAC frame. In one embodiment, the ack-window is represented as a bitmap with each bit representing the acknowledgement status (Ack/Nack) for each MAC frame. The initial offset of stream sequence number is supplied with the ack-window in each ack-command. Using this representation, all the acks for the MAC frames in an RX-stream are, grouped and sent back in one command when the destination device gets its opportunity for transmission.

8.7.2.2 Retransmission Window

The retransmission window is defined as the sequence of MAC frames in their increasing order of sequence number that can be stored at the source device available for retransmission. Hence, this window size depends on the tolerable delay or latency, expected channel conditions, and throughput requirements for a stream. The retransmission window size is computed during the stream connection setup taking into account the above factors. During the transmission, the window size is optimized for the tolerable delay after which a MAC frame may be discarded if it has not been acknowledged by the destination device.

8.7.2.3 Maximum Number of Retransmissions

The maximum number of retransmissions of a MAC frame in a stream is negotiated during the stream connection negotiation. This number can also be negotiated to be zero for no retransmissions if necessary.

8.7.2.4 Discarding MAC frames

For a completely reliable stream connection, when the maximum window size is reached, the MAC frames in the buffer are retransmitted and no new MAC frames are transmitted until the destination device sends an Ack. Hence for completely reliable stream connections, the MAC frames are never discarded.

For time constrained streams, like voice, the source device can discard MAC frames if they are too old. This type of discarding is performed based on the maximum delay tolerable for that stream. Whenever a MAC frame is discarded at the source device, the destination device is kept informed of the occurance. The destination device must appropriately update its ack-window and receive window when such an indication is received from the source device.

Similar to the MAC frame discard operation at the source device, the destination device can also discard MAC frames in a time-constrained stream. In such situations the destination device informs the source device to discard the MAC frames up to a certain sequence number. The source device must appropriately update its ack-window and retransmission window when such an indication is received.

8.7.2.5 Retransmissions when No acknowledgement is Received

A source device may not receive the ack command from the destination device if the acknowledgement MAC frame that was sent by the destination device is lost or corrupted in the channel. In such situations, the source device need not do any retransmissions in its next transmit slot. Instead, it can assume that all the MAC frames sent in the previous transmission slot have been received by the remote. However the source device must be ready to retransmit those MAC frames if the destination device sends any NAck later.

8.8 Channel Measurement

Each device measures the channel in terms of packet loss rate (PLR). This information is periodically sent to the PC as feedback on the channel along with other channel related information like number of frames transmitted, number of frames received from the current BSS, number of packets received from other BSSs, etc. The PC uses this information along with its own measurements to assess the channel conditions. This channel assessment is used for channel changing, decisions and also to detect or assess the overlap situations.

8.9 Dynamic Channel Change

The last option in combating a severe channel is to change over to a better channel. Using the channel status from all the client devices and the measurements made locally, the PC decides whether to change from the current channel to a better channel. The PC carries this operation out by first searching for a good channel and then instructing all the client devices to move over to the new channel. The channel changing can happen in two situations: first, during the association of an MMS to a PC when they are in different channels; and second, during the operation of a BSS when the current channel of operation has low throughput to offer, either due to too many BSSs sharing the channel, or due to high interference. The following paragraphs describe these two situations and explain the process of changing the channel of operation.

The PC of a BSS always tries to be in a channel, with sufficient available bandwidth unless all the devices are in the DCF-only mode of operation. This is true even when the BSS does not have any MMS. When an MMS wakes up and needs an association, it searches all the possible channels for a PC by sending its request and timing out in each channel before changing over to the next channel. This assures that an MMS will always find a PC, even if they are in different channels. When the PC recognizes the association request from an MMS, it authenticates the MMS and at the same time it starts negotiations with any BSS-group that may be operating in that channel. Once the PC obtains the duration for its own CFP, it sends the beacon in the channel at its TBTT. The MMS requests the bandwidth, obtains connection with another MMS and starts using the channel. If the MMS that needs to be connected is in another channel, it is the responsibility of the PC to request the first MMS to remain quiet and search the other channels for the second MMS. The PC achieves this by sending request signals addressed to the second MMS in each channel. The PC requests the second MMS to move to the original channel of the PC's operation and establishes the connection in that channel.

The second situation requiring channel selection is when the PC or one of the MMSs experiences serious channel impairments despite higher degree of ECC. Each MMS and the PC in the BSS measure the channel status in terms of packet error rates and packet loss rates that they are experiencing. The MMSs send the measured channel status to the PC periodically. Using the channel status from all the MMS and the one measured locally, the PC decides to change the current channel and move the network operations to a better channel.

The mechanism used to decide the channel change is not discussed as it is beyond the scope of this description. Once the PC decides to leave the current channel, it searches for another free channel. This is achieved by informing all the MMSs to remain quiet through a broadcast message and snooping other channels for operation of BSSs or for the stray energy measured in terms of CCA mechanisms. As all the MMSs are required to remain quiet due to the absence of the beacon from the associated PC, there will be a momentary pause in the network operation. If a free channel is found, the PC switches back to the original channel, broadcasts a change channel command to all the MMSs and expects acknowledgements back from each individual MMS. Each MMS changes channel only after it sends repeated acknowledgement messages to the change channel command from the PC. If an MMS does not respond, the PC, after attempting to reach it a predetermined number of times, decides that the MMS is unreachable and times out.

Similarly, the MMS, after waiting for a predefined length of time, decides that the PC is unreachable and starts searching for the PC in other channels. The PC changes channel after all the MMSs respond or after the time out condition is reached. Once in the new channel, the MMSs wait for the beacon from the PC to start the communications. To announce its presence in the new channel, the PC broadcasts a change channel message with the indication of the destination channel as the current channel and expects acknowledgement from each MMS. If an MMS does not respond within a predefined number of attempts, the PC decides that the MMS is disconnected. After identifying all the MMSs the PC starts the regular network operations. If a BSS is currently sharing bandwidth with other BSSs, the PC of the BSS that is changing the channel should inform the MC before moving the network operations over to a new channel.

After deciding to change the channel, if a free channel is not found, the PC simply returns to the original channel and broadcasts change channel message with the current channel as the destination channel. After this it starts normal operation by sending out beacons and expecting the MMSs to communicate as before.

9 Operation of Overlapping Subnets in the Same Channel

Figure 19:
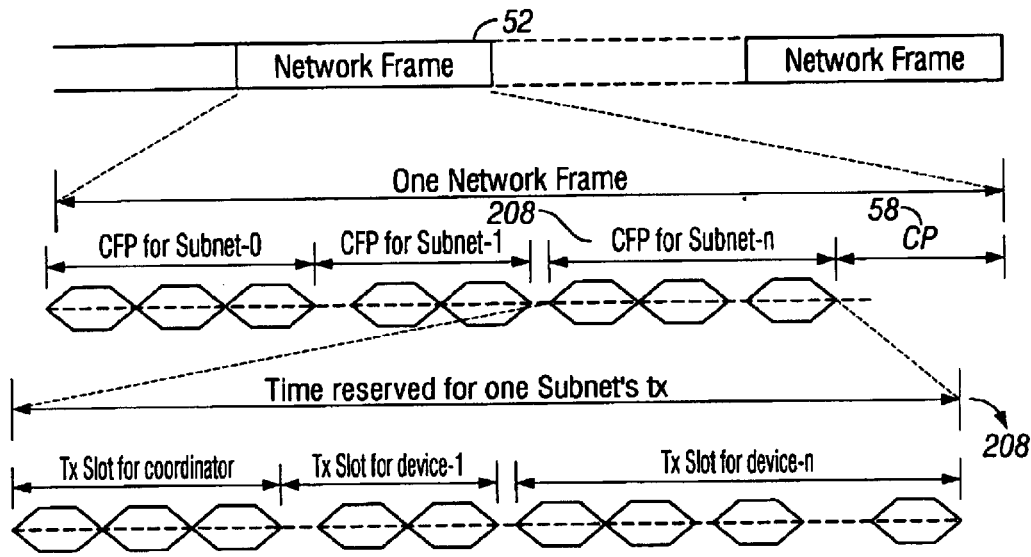
FIG. 19 illustrates an example of the transmissions slots of each one of several subnets in a complete overlap scenario according to one embodiment of the present invention.
Figure 20:
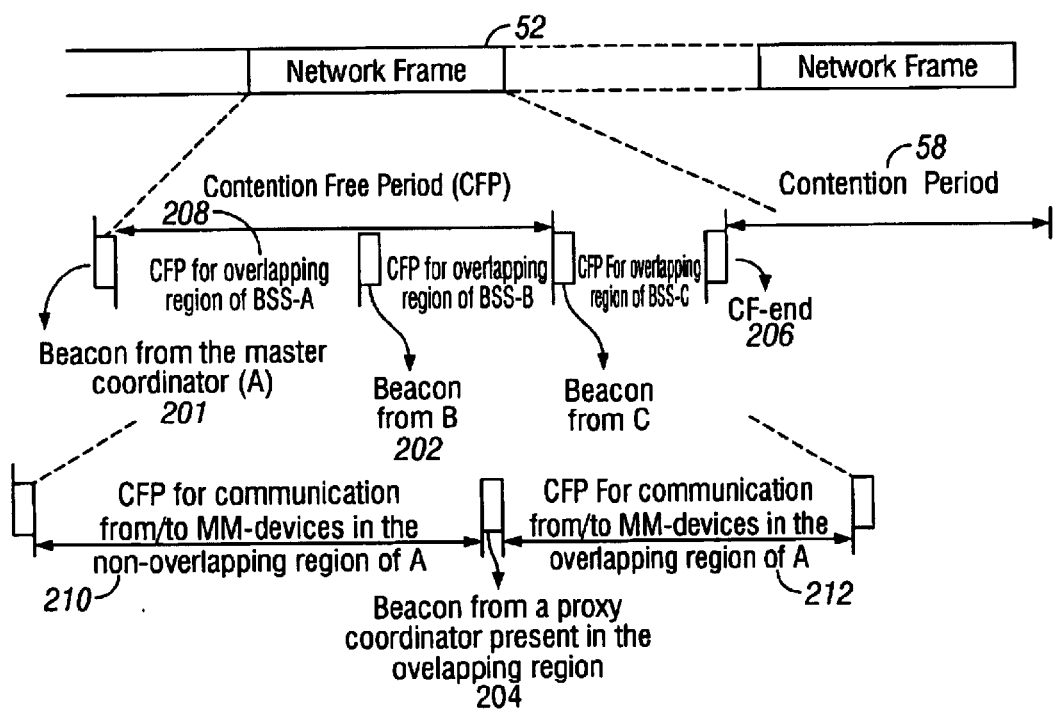
FIG. 20 illustrates an example of the beacon distribution for transmissions of several subnets in a complete overlap scenario according to one embodiment of the present invention.

This scheme aims to achieve a "Share and Survive" policy by providing for the CFP operation of overlapping subnets in the same channel as shown in FIG. 18. The operation of overlapping subnets 180 in the same channel 182 is achieved by sharing the bandwidth among those subnets through appropriate negotiations. The BSS-SID serves as the subnet index in this mode of operation. The BSS-SID is used to achieve the slot synchronization among the transmissions of PCs of all the overlapping subnets. The transmissions of each subnet with respect to the Master Coordinator are shown in FIG. 19.

The coordinator of the first subnet occupying the channel also takes the responsibility of the Master Coordinator (MC) and assumes an all-zero BSS-SID. Each subnet negotiates its contention free duration and an overall contention free period is formed starting from the beacon of the MC 201. The other subnets are provided with network synchronization parameters such as BSS-wait-time and BSS-tx-time. The wait times are always measured from the beacon from the Master Coordinator. This forms a two stage wait time, where each PC waits for a pre-negotiated duration of time from the MC's beacon and the client devices within a subnet wait for a pre-negotiated Tx-slot some length of time from the start of the individual CFPs 208.

Further, to increase the bandwidth utilization, the subnets need to negotiate (or expose) only the bandwidth required for the devices in the overlapping region. This includes both the TX and RX streams of those devices. The rest of the individual CFPs for non-overlapping devices 210 need not be negotiated with other subnets. In essence, one can imagine a set of CFPs negotiated for all the devices in the overlap region 212 in all the subnets. Each subnet must have its own CFP 208 encompassing all the its allocated pieces. The negotiated piece of CFP for other subnets are strictly kept unallocated in the current subnet. This results in non-overlapped CFPs 212 for the devices in the overlapped region. Additionally, the CFP for devices of a subnet in the non-overlapped region 210 can overlap with the CFP meant for the devices of another subnet in its non-overlapped region 210.

9.1 Proxy-Coordinator to Assist Overlap Subnet Operation

This section describes the operation of overlapping subnets when the PCs cannot receive from each other while at least one of the online clients can receive from both PCs. In this scenario, the device that can receive from both the PCs assumes the responsibility of a proxy-point-coordinator and tunnels the negotiations between the two PCs. Any device that can hear two PCs (with all zero BSS-SID) can volunteer for this responsibility with its PC. If there is more than one device that is in the overlap region, the PC can choose one of those devices for this responsibility.

As shown in FIG. 21 a proxy point coordinator (PPC) 214 essentially provides a tunnel for the communication between the Master Coordinator 216 and a PC 218 that is not able to receive from the MC. The subnet sharing the channel with the assistance of the proxy coordinator 214 uses the beacon from the proxy-coordinator 204 as time reference. This result in marginally increased overhead on the channel bandwidth, but keeps a close time synchronization of transmissions among the channel sharing subnets.

Whenever a proxy coordinator wants to leave the subnet it does so only after informing both the Master-Coordinator and the subnet that it is currently servicing. The Master Coordinator tries to shift the link to another device that can receive from both sides. If this is not possible, there is no overlapping region between the subnets and the subnets can form their own independent BSS using in the same channel without interference.

10 Management Command Channel, Commands and their Payloads

The following section describes the implementation of commands to accomplish the aforementioned functions. These commands are the preferred embodiment to fully implement the features of the present scheme but, as one of ordinary skill in the art may realize, other implementations that accomplish the same result are possible. The following descriptions are hence as a mode of example and not limitations of the present invention.

The management command channel is nothing but one or more management command frames sent by a device in its allocated transmission slot. If there are no commands to be sent in a slot, the device is free to use that bandwidth for any buffered data transmission. If there is a command received it is mandatory for the device to process that command and send out the response without delaying the command's transmission. There is no explicit ack for the command frames. Instead the reliability of the command transportation is build into the structure of command frames as explained later.

The command frames are always error protected using RS(255, 239) coding. The broadcast MAC frames are not encrypted and the unicast command frames can be encrypted. Command frames between the overlapping subnets must always be sent unencrypted and error protected using RS(255-239) coding. The BSS-SID in the MAC header is used to distinguish the source of the command originator. These frames must have only the inter-subnet bandwidth-negotiation commands. They must not have any commands related to clients within a subnet.

10.1 Null Command

Figure 22:
FIG. 22 illustrates an example of a Null command according to one embodiment of the present invention.

The Null command, shown in FIG. 22, has no payload and has no payload length field. The receiving device is expected to throw away all the NULLL commands that are received in a command frame.

10.2 Stream Management

Figure 23:
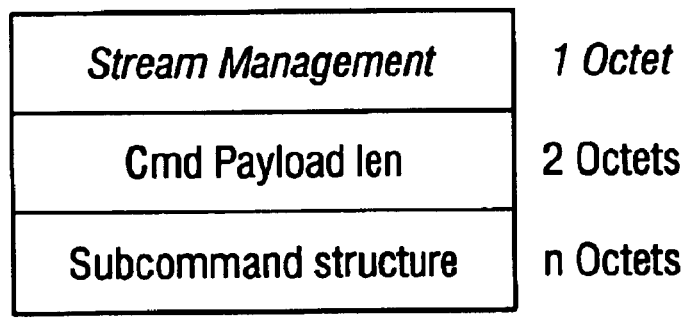
FIG. 23 illustrates an example of a Stream Management command according to one embodiment of the present invention.

This command, shown in FIG. 23, is used to setup and tear down a stream connection between two devices in the network. There are several subcommands under this command and they are described in the following sections.

10.2.1 Restart All Stream Connections

Figure 24:
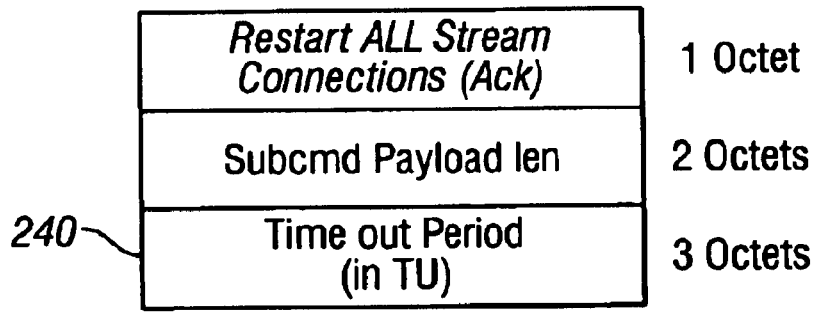
FIG. 24 illustrates an example of a Restart All Stream Connections Subcommand according to one embodiment of the present invention.

This subcommand is sent to all the devices that are currently connected in the network to synchronize their stream connections with the other devices. This is critical when a device gets disconnected and connects back within the timeout periods of other devices. The device might have lost all its stream connections while some devices in the network, not realizing of the disconnection still have them alive. This synchronization command brings them all to the same state of no streams with the current device. Hence, they all need to restart their stream connections with the current device. The subcommand structure is shown in FIG. 24. The timeout period 240 indicates the time by when the response is expected. This provides some time for the device to clean up its stream list and send the response.

10.2.2 Restart All Stream Connections Ack

The devices that receive a Restart-All-Stream-Connections subcommand must send this subcommand as the acknowledgement. The subcommand structure is the same shown in FIG. 24 wherein the timeout period is ignored.

10.2.3 Stream Connection Request

Figure 25:
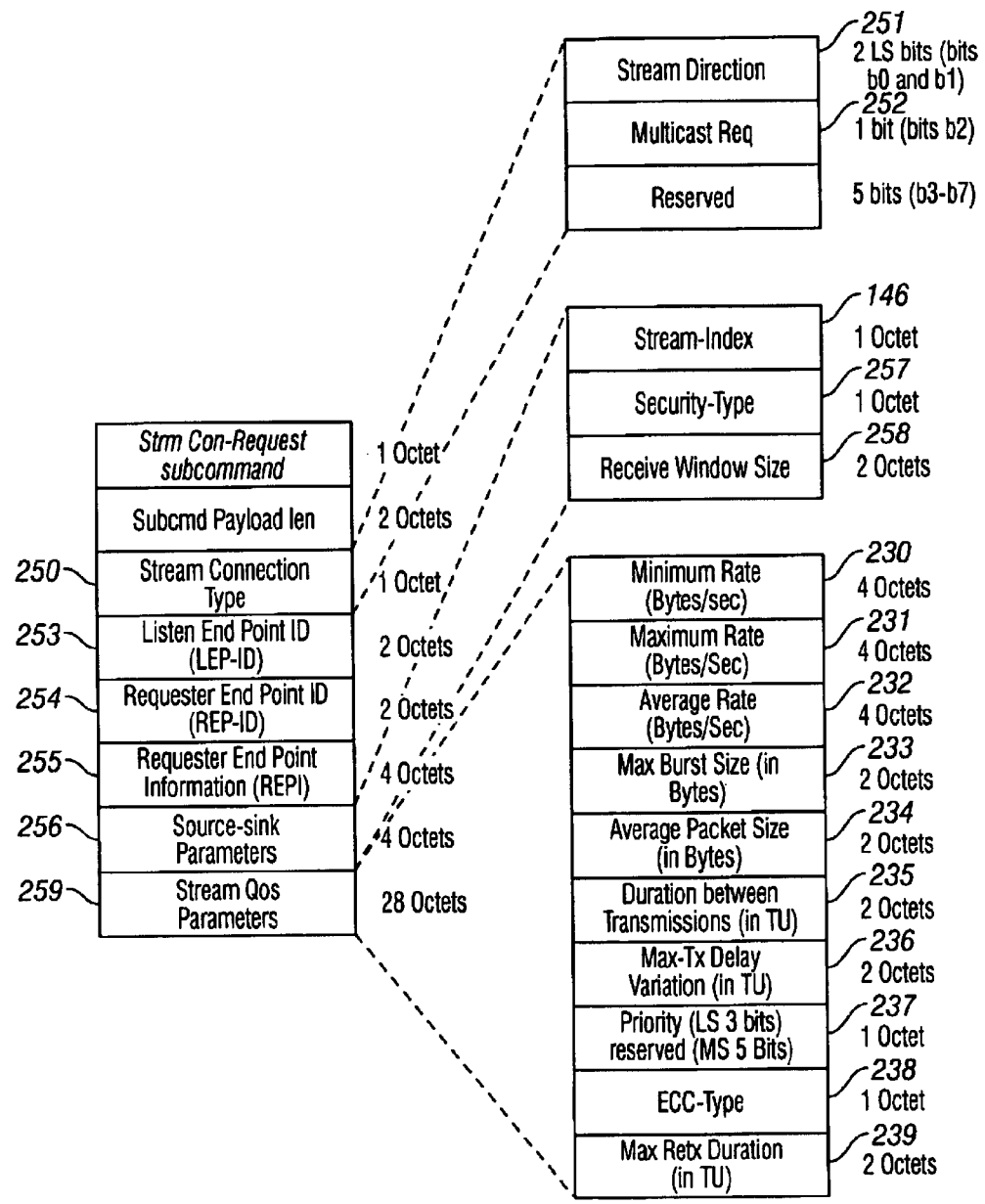
FIG. 25 illustrates an example of a Stream Connection request subcommand structure for transmit or receive streams according to one embodiment of the present invention.

This subcommand indicates whether the request is for a transmit stream or receive stream or both. This subcommand also indicates the desired stream characteristics, which includes the stream QoS parameters. The subcommand structure is shown in FIG. 25.

The stream connection type 250 is one octet field containing two sub-fields. The stream direction 251 (least significant 2 bits) indicates whether the stream connection is for a transmit-stream (1) or a receive-stream (2) or both (3). The value '0' for this field is invalid. The bi-directional stream request comes handy in one server and multiple client applications, where one server application can request bi-directional stream connection without an active client application at the destination device.

The multicast streaming request field 252 is a one bit field (bit b2) indicating a request to connect to an already established stream if there is a stream that is already present at the indicated LEP-ID 253. If there is no stream with the required LEP-ID, a new stream is created. By setting this bit high, it is possible to request to send one stream from a device to a group of devices in the same subnet. This group is the multicast group for that particular stream. If there is a stream that exists with the indicated LEP-ID, the source device gets a multicast stream permission from the PC and then only provides the stream parameters and stream index to the device that is trying to join the multicast stream group. Note that the stream direction must not be set to 'bi-directional' if the multicast stream request bit is set. The source device can also use the multicast request bit to invite a multicast stream connection to another device.

The Listen End-Point ID (LEP-ID) 253 indicates the destination end point to which the stream connection is intended. The Requester End-Point ID (REP-ID) 254 indicates the end point identification at the requesting device. The Requester End Point Information (REPI) 255 is a 4-octet field that is supplied by the agent requesting the stream connection. This field is passed unaltered to the agent at the destination device. The Source-Sink parameters 256 include the stream index 146, security type 257 and the receive window size 358. The source device 154 always issues the stream index 146. The defined security types 257 are 0 for no security and the rest are reserved. The receive window from the source device 154 is a request to the destination device 156. However the destination device makes the final decision on the receive window.

The stream QoS parameters 259 contain fields regarding bit-rates required 230–232, acceptable latency 235/236, priority of the stream 237, error correction 238 and the retransmission requirements 239 of the stream. If the connection request is for a stream to be received, the initiating device can suggest these parameters. The source device makes the final decision on these parameters considering the request from the receiving device.

The instantaneous rate variation of the stream is characterized by the minimum 230, maximum 231 and average 232 rates in bytes/sec provided by the source device. Additionally the source device provides information such as maximum burst size 233 and average MAC frame size 234 to better characterize the streams behavior. This information can be used by the bandwidth request/allocation mechanism to better cope with the changes in the instantaneous rate of the stream.

The latency requirements of the stream are indicated through the duration between transmissions 235 and the maximum transmission delay variation 236. The duration between transmissions 235 indicates the frequency at which the stream needs to be transmitted. The maximum transmission delay variation 236 indicates the jitter allowed around the duration between transmissions without violating the latency requirements of the stream.

The priority 237 is a 3 bit field allowing up to 8 priorities bot only four priorities are defined. The ECC type 238 is an 8 bit field that allows up to 256 types of error protection/correction schemes. The following values of ECC types are defined in the present scheme:

0->Use CRC for the stream
1->RS(255, 239) over $GF(2^8)$
2->RS(255, 223) over $GF(2^8)$
3->RS(128, 112) over $GF(2^8)$
4->RS(128, 96) over $GF(2^8)$
5–255 are reserved Note that the size of the first block in every MAC frame is always fixed to RS(255, 239). The above negotiation of ECC type applies only from the second block onwards. Hence RS(n, k) means that from the second block onwards, the block size is 'n' bytes with information being 'k' bytes unless there is less than 'k' information bytes remaining in the MAC frame. This can happen if the data in the MAC frame is (239+lk+m) bytes where 'l' is an integer (l=0, 1, 2, 3, . . . ) and 'm' is less than 'k'.

The maximum retransmission duration 239 indicates the time over which the retransmission of the MAC frame is meaningless. The value '0' in this field means no retransmission is required and all-one value means retransmission forever to provide completely reliable transmission of the stream.

The subcommand structure to establish a TX-stream and an RX-stream at the same time is shown in FIG. 26. The stream direction 251 for this structure should be set to 3. Though this will eventually result in establishing two uni-directional streams, this is useful when both the streams have to be established at the same time with bandwidth allocated to them at the same time.

10.2.4 Stream Connection Accept

The stream connection accept message is the acceptance acknowledgement from the destination device 156. The subcommand structure shown in FIG. 27 is similar to that for a Stream Connection request, except for the addition of an acceptor end point ID (AEP-ID) 270. This ID, similar to REP-ID, is allocated dynamically by the accepting device and uniquely identifies the stream connected at its end. The REP-ID remains as the end point ID for the stream at the device that initiated the request for stream connection. Additionally the accepting device sends its own information embedded in AEPI field 272.

This subcommand is sent only if the LEP-ID is valid at the accepting device and a stream connection at that end point is acceptable. The stream parameters should be same as those dictated by the source device 154. The stream index 146 in this subcommand should be a valid, unique index for the stream that is being established.

10.2.5 Stream Connection Negotiate

The stream connection negotiate message is used by the destination device to suggest its own stream parameters. The subcommand structure is also shown in FIG. 27 since it is similar to that for the Stream Connection request message except for the addition of an acceptor end point ID (AEP-ID) 270 making it identical to the stream connection accept command. This ID, similar to REP-ID, is allocated dynamically by the accepting device and uniquely identifies the stream connected at its end. The REP-ID remains as the end point ID for the stream at the device that initiated the request for stream connection. Additionally, the accepting device sends its own information embedded in AEPI field.

This subcommand is transmitted if the LEP-ID is valid at the accepting device and a stream connection at that end point is acceptable. If certain parameters in the stream connection request are not acceptable to the current device, in contrast with the stream connection accept command, here the current device can insert its acceptable values in the corresponding fields of this subcommand. The requesting device should consider these parameters, though the decision of the source device is final. Upon such a decision, the requesting device should re-send its parameters.

This subcommand can also be used to negotiate a different set of stream parameters even after the stream connection is established and during the stream communication. At any time if the parameters cannot be negotiated, either of the devices can reject the connection. If they are negotiated, a stream connection accept is expected from one of the devices as the final subcommand of negotiation session. The stream index in this subcommand should be a valid, unique index for the stream that is being negotiated.

Note that if this stream is being shared in a multicast stream group, the source device is responsible for negotiating the terms with all the devices that are currently participating in the multicast stream group.

10.2.6 Stream Connection Reject

The stream connection reject is transmitted during the connection establishment process if the stream parameters are not acceptable. The subcommand structure is shown in FIG. 28. The RxEP-ID 280 is the end point ID for the stream at the device that received the request for stream connection. The SEP-ID 282 is the end point ID for the same stream(s) at the device that sent the stream connection. The stream index is ignored in this subcommand.

Some defined reason codes are:
0->Invalid stream/params
1->non-negotiable stream parameters
2->Resources unavailable
3->No Listen Entity
4->Listen Entity Busy
5->Peer Response timed out
6->BW allocation timed out
7->BW allocation failure
8->Currently disconnecting from subnet
9->Stream connection can not be processed
10->too many streams
11->Lack of required security at the requester
12->Lack of required security at the rejecting device
13->Not authorized to avail this connection
14->too many devices connected to this stream
15–255 reserved

10.2.7 Stream Connection Complete

Once one of the two involved devices sends the stream connection accept subcommand, both the devices move on to the final stage of connection establishment. This stage involves obtaining the channel bandwidth for the connection. If the source device does not already have the bandwidth required for the stream, it asks the PC for the new bandwidth allocation using the DBM mechanism. Once such an allocation is made, the source device sends the stream-connection-complete subcommand to the other device and starts sending out the stream MAC frames. If the bandwidth allocation is unsuccessful, a stream connection reject subcommand is sent from the source device. Note that for a bi-directional connection, each device should carry out the bandwidth negotiation for the stream they are sourcing.

10.2.8 Stream Disconnect

The stream disconnect message may be sent when an already established stream needs to be disconnected. The subcommand structure is shown in FIG. 29. The RxEP-ID 280 is the end point ID for the stream at the device that receives the request for stream disconnection. The SEP-ID 282 is the end point ID for the same stream(s) at the device that sent the stream disconnection subcommand. Whenever this subcommand is received, the stream connections, transmit and/or receive, associated with the RXEP-ID and SEP-ID should be disconnected. The stream index in this subcommand should be a valid, unique index for the stream that is being disconnected. The defined reason codes are same as those listed in the section above for stream connection reject subcommand.

10.2.9 Stream Disconnect Ack

The stream disconnect ack message may be sent in reply to a stream connection disconnect subcommand. The subcommand structure is also shown in FIG. 29. The RxEP-ID 280 is the end point ID for the stream at the device that receives the request for stream disconnection. The SEP-ID 282 is the end point ID for the same stream(s) at the device that sent the stream disconnection subcommand. Whenever this subcommand is received the stream connections, transmit and/or receive, associated with the RxEP-ID and SEP-ID should be disconnected. The stream index in this subcommand should be a valid, unique index for the stream that is being disconnected.

10.2.10 Stream Authorization Permission Request

The source device sends this subcommand to the PC to obtain the authorization for a device that is requesting the stream. The same subcommand is applicable to allow a device to join a multicast stream group. The subcommand structure is shown in FIG. 30. RxAddr 300 is the address of the device receiving the multicast stream connection. The source address can be obtained form the header of the frame. The authorization request should be performed for one stream at a time. Hence the 'bi-directional' stream indication need not be used in this subcommand.

10.2.11 Stream Authorization Grant

This is the subcommand transmitting by a PC for authorizing a stream to be admitted. The subcommand payload is same as that shown in FIG. 30. When this command is sent by a PC, it indicates that the PC has authorized the stream consumption and has admitted the QoS for the stream. However, a DB-Grant command, with all the required parameters for network synchronization, is expected from the PC before the source device can start transmitting the stream.

10.2.12 Stream Authorization Reject

This is a subcommand transmitted by a PC for authorizing a stream to be rejected. The subcommand payload is same as that shown in FIG. 30.

10.3 Dynamic Bandwidth Management (DBM)

There are four subcommands under this command that are used for dynamic bandwidth negotiation. This negotiation can be performed periodically and takes into account the bandwidth/latency requirements of the device aggregated over all the streams that it is currently transmitting. The command structure is shown in FIG. 31. The subcommands are discussed in the following sections.

10.3.1 Dynamic Bandwidth Request (DB-Req)

The client uses this subcommand to negotiate new bandwidth and latency parameters with the PC. The payload structure of this subcommand is shown in FIG. 32.

All the bandwidth requests 321 are in bytes per second and all the latency requests 322 are in TUs (1024 microsecs). A device can request bandwidths at different latencies. For example, if a device is streaming voice and audio/video, it can request a voice bandwidth with a lower latency and an audio/video bandwidth with a larger latency. The requests 320 are chained as shown in the FIG. 32 and the total of all such requests 324 is sent as the first 16 octets of the subcommand payload.

Figure 32:
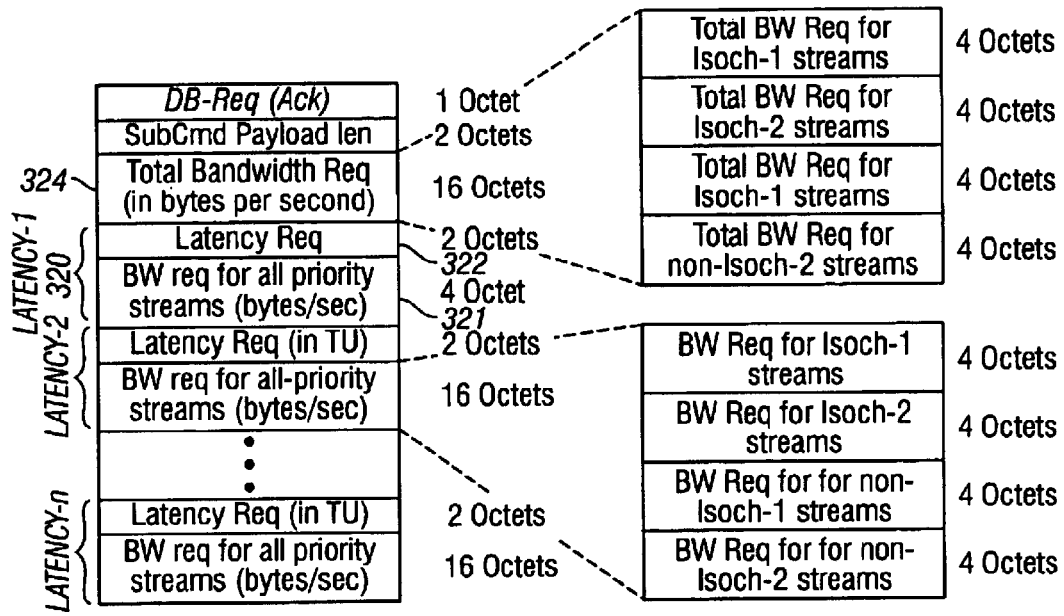
FIG. 32 illustrates an example of a Dynamic Bandwidth Request subcommand according to one embodiment of the present invention.

The client device should accumulate all the individual stream requirements into groups of latency requests and send the same in the format shown in FIG. 32. The PC may attempt to allocate all the bandwidth at the requested latency in the order of stream priority.

10.3.2 Dynamic Bandwidth Request Ack (DB-Req-Ack)

A PC uses this subcommand to acknowledge the DB-Req subcommand from the client. The payload structure is same as that for the DB-Req shown in FIG. 32. This subcommand does NOT mean that the requested bandwidth is allocated, but only means that the PC has received the request and is processing that subcommand.

10.3.3 Dynamic Bandwidth Grant (DB-Grant)

Figure 33:
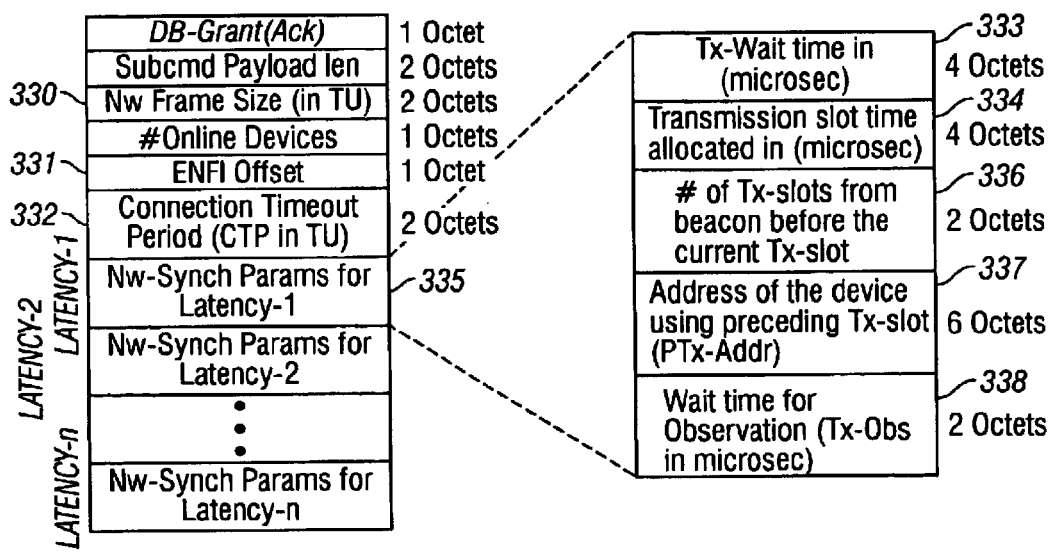
FIG. 33 illustrates an example of a Stream Management Grant subcommand according to one embodiment of the present invention.

The PC uses this subcommand to send the finalized DB-parameters to the client. A payload structure is shown in FIG. 33. All the parameters used in the section for network synchronization are made available to the client by the PC in this subcommand.

The network frame size 330 is indicated in TU (1024 micro seconds). The Effective network frame index (ENFI) offset 331 indicates the relative network frame index from which time the Stream Management parameters should be used. An all-one value of ENFI indicates that the client has an option to accept the BW and send DB-Grant-Ack or send a new DB-Req for negotiation. Ultimately the PC makes the final decision and sends the DB-Grant with a valid ENFI to force the decision on the client. The client has the option of disconnecting one or more streams if BW/latency is not acceptable. The CTP 332, with the minimum value of one second, in the DB-Grant subcommand supercedes all the other CTPs.

The transmission wait time 333 and the slot time 334 in the Network synchronization parameter 335 is indicated in microseconds. The number of tx-slots before the current tx-slot 336 includes any previous transmission slots by the current device in the same network frame. The PTx-Addr field 337 indicates the address of the device that precedes the current device in a transmission list. This address can be a broadcast address indicating that the PC does not allow the current device to take over the channel when the previous device finishes early. The Tx-Obs field 338 indicates the relative time duration from a beacon for which the device is not allowed to listen for the last frame transmission from a previous device. When there are multiple transmission allowed for a device within a network frame, the devices starting after this device are limited in their time window of observation using this field.

10.3.4 Dynamic Bandwidth Grant Ack (DB-Grant-Ack)

Dynamic Bandwidth Grant Ack has the same payload as the DB-Grant subcommand (FIG. 33). Upon receiving the DB-Grant subcommand, the client is expected to send the parameters back to the PC in the ack subcommand to indicate its acceptance of the parameters. The ENFI offset 331 in the DB-Grant-ack subcommand is ignored at the PC.

10.4 Remain Quiet and Remain Quiet Ack

Figures 34, 35, 36:
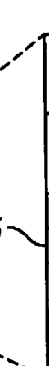
FIG. 34 illustrates an example of a Remain Quiet/Ack Command according to one embodiment of the present invention.
FIG. 35 illustrates an example of a Change Channel/Ack Command according to one embodiment of the present invention.
FIG. 36 illustrates an example of a Channel status Command according to one embodiment of the present invention.

In one embodiment, the Remain-Quiet command, shown in FIG. 34, is sent from the PC node informing all clients to remain quiet until it can check the other channel and come back. The client is expected to respond by sending back a Remain Quiet Ack message. The time out field 342 indicates the maximum time period through which the client must wait. If the PC did not come back and resume the operation either through change channel command or through a beacon, the client disconnects itself and searches for the PC.

10.5 Change Channel and Change Channel Ack

When the PC decides that another channel is better than the current channel, it can use Change Channel command, shown in FIG. 35, to inform all the clients to switch channels. The time out field 352 indicates the maximum time period within which the client must switch channels and wait for the PC in the new channel. If the client does not send any frame after the beacon from the PC within that time, the client is declared disconnected and is required to associate again. Similarly, if the client does not receive a beacon from the PC within the specified timeout period, it disconnects and searches for the PC.

10.6 Channel Status

In one embodiment of the present invention, a Channel Status command may be sent at a regular interval by the clients to inform the PC node regarding their channel status. The channel status bytes form the payload of the MAC frame. A command structure is shown in FIG. 36.

The channel statistics are measured separately for each of the devices that the current device is receiving data from. The address of the client (or BSS-ID) for which the channel statistics is measured may be provided in the command sent to the PC as shown in FIG. 36. In one embodiment, the Tx-Address 362 may be a broadcast address to indicate an aggregate channel statistics. The duration of connection 363 is provided to the PC in order to keep track of connection times between devices for proxy service purposes. If TX-Address is set to all-ones, then the address indicated in the TX-Address/TX-BSS-ID is actually another BSS. That is, the current block payload is for another subnet whose frames are received by the sending device. The Transmit MAC frame Count in measurement window (TPCW) 364 is the total count of all the MAC frames transmitted by the client device within the measurement window. In addition, the Receive MAC-frame Count in Measurement Window (RPCW) 365 is the total count of all the MAC-frames received by the client device within the measurement window. The total number of MAC frames that were received in error within the measurement window is represented by the Receive MAC-frame Error Count (RPECW) 366. The MAC frame loss count (PLCW) 367 represents the total number of MAC frames that were not received (requested retransmission) within the measurement window. The Channel measurement window (CMW) 368 field indicates the duration of the time, in TU (1024 microseconds), during which the measurement was conducted. The client device selects this duration, which is used by the PC. The device may restart the measurements in the new time window.

10.7 PC Redundancy

Figure 37:
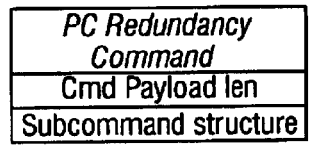
FIG. 37 illustrates an example of a PC Redundancy command according to one embodiment of the present invention.

In one embodiment, APCs use the PC Redundancy command, shown in FIG. 37, to negotiate for the responsibility of the PC in the subnet. Additionally, the PC uses this command to hand over its responsibility to an APC when it shuts off or becomes overloaded. The subcommands used in this process are discussed in the sections below.

10.7.1 PCR Negotiation

Figure 38:
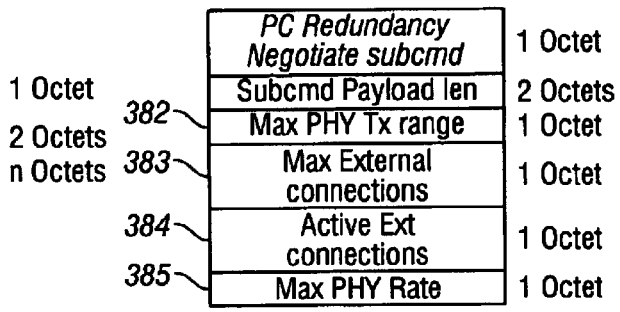
FIG. 38 illustrates an example of a PCR Negotiation subcommand according to one embodiment of the present invention.

In one embodiment, a PCR Negotiation subcommand is used when the PC is absent and a subnet needs to be established. Multiple APC's in a subnet can send this command and negotiate for taking over the responsibility of the PC in the subnet. A command payload structure is described in Table 1 and is shown in FIG. 38.

In one embodiment, the Max-PHY-Tx-range 382 of the command indicates the free-air distance range (in meters) that is possible for the device. The command's Max External connection field 383 represents the number of physical (wired/wireless) ports that are available on the device for connections outside the current subnet. The Active Ext connection field 384 indicates the number of currently active physical (wired/wireless) ports other than the current subnet and the Max PHY rate 385 indicates the maximum possible bit rate in Mbits/sec at the PHY layer of the device.

10.7.2 PCR Pullout

An APC device uses this command to pullout of multi-device negotiation session if it has received a PCR-negotiation subcommand from another device that is better suited for the operation. An example of a payload structure is shown in FIG. 38.

10.7.3 APC Assuming PC Responsibility

In one embodiment, if a device decides that it is better suited to perform the PC function than the other devices in the subnet, then it takes over the PC responsibility. This command is sent out to inform other currently negotiating devices about the assumption of the PC responsibility. A sample command payload structure is also the one shown in FIG. 38. If there are multiple devices sending this command, then the effect of this command is similar to the effect of a PCR negotiation command. The devices constantly compare the contents of this subcommand transmitted by other devices. If another device is better suited as a PC, the current APC sends out the PCR pullout subcommand.

10.8 Proxy Services

Figure 39:
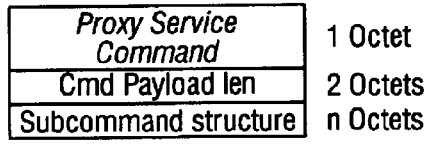
FIG. 39 illustrates an example of a PPC command according to one embodiment of the present invention.

This command, illustrated in FIG. 39, is used to provide the services of PPC in a subnet as discussed in section 6.2. The subcommands are discussed in the following sections.

10.8.1 PPC Service Request

Figure 40:
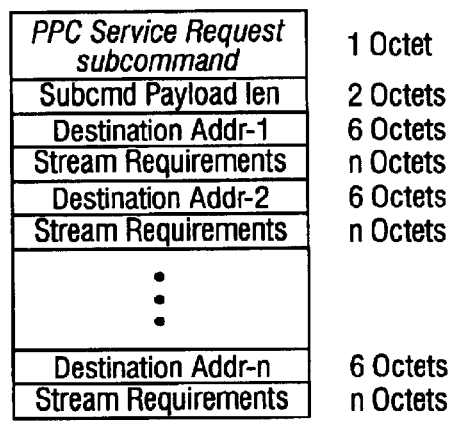
FIG. 40 illustrates an example of a Proxy service request subcommand according to one embodiment of the present invention.

In one embodiment, a client can use a PPC Service Request sub-command, shown in FIG. 40, to request the service of a PPC upon recognizing that a link between itself and another device, including the PC, is too poor for proper communication. This sub-command is always broadcasted. The requesting client should mention all the devices to which this subcommand applies, in addition to the transmission requirements for a corresponding link. If the client requests this service for all the links, then it may mention a broadcast address and an overall QoS request, instead of mentioning all the devices in the subnet.

10.8.2 PPC Provider Request

Figure 41:
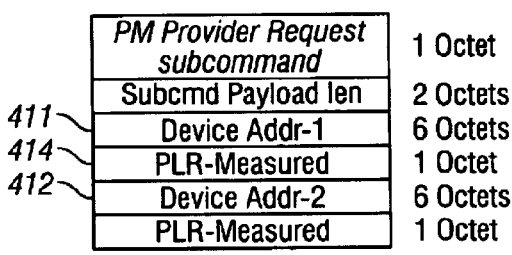
FIG. 41 illustrates an example of a PPC provider request subcommand according to one embodiment of the present invention.

In one embodiment of the present invention, a device may volunteer to be a PPC when it recognizes a request for such a service. A device may volunteer to provide a proxy service between two specific devices by specifying their addresses in Device Addr-1 411 and in Device Addr-2 412 of FIG. 41. Alternatively, a device may volunteer to provide the proxy service between a specific device and the rest of the network as seen by the volunteering device. This is indicated to the PC by using a broadcast address as the second address 412.

Many devices may volunteer to provide proxy service for a specific device. The PLR-Measured field 414 indicates the channel condition between the volunteering device and the device whose address precedes this field. The PLR is indicated as average number of MAC frames lost in every 10,000 MAC frames. In an embodiment in which multiple devices volunteer, the PC makes the final selection among the volunteers.

10.8.3 PPC Service for Subnet Connection

Figure 42:
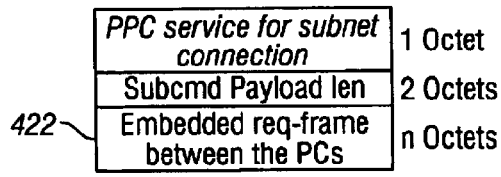
FIG. 42 illustrates an example of a PPC service for subnet connection subcommand according to one embodiment of the present invention.

In an embodiment of the present invention, a device may volunteer for PPC service by embedding the incoming proxy-scv-reg MAC-frame in the subcommand 422 of FIG. 42, and sending it to the PC. The PC responds back using the same subcommand with the payload being the response MAC frame for the new device. The volunteering device simply transmits the embedded MAC frame as a new MAC frame by itself. After the connection is established, the PC sends PPC-permission-grant and confirms the PPC role of the volunteering device between the new device and the PC.

10.8.4 PPC Permission Grant

When the PC selects a PPC, the decision about the selection must be broadcasted to the entire subnet. The subcommand structure is illustrated in FIG. 43. The ENFI 331 is the Effective Network Frame Index and is discussed in section 10.3.3. The rest of the fields contain the addresses of the devices in the order of their appearance in the chain. Hence the first and the last address indicate the devices that are serviced under this proxy service chain. The PC expects an ack from each of the devices listed in this subcommand. This command also acts as the breaking of the previous link between device-1 and device-2. In this case, the PC expects an ack from the PPC that was present in the immediately previous arrangement that is removed from the current arrangement.

10.8.5 PPC Permission Ack

All the devices listed in the currently received PPC Permission Grant command from the PC, FIG. 43, send out an acknowledgment. Additionally, all the PPCs that were serving in the chain for device-1 and device-2 in the immediately previous arrangement that are removed from the current arrangement also send an acknowledgment. This confirms that all the involved devices are in synchronization with the arrangement. The subcommand structure is shown in FIG. 43. The ENFI field 331 from PPC permission grant command is decremented and sent in the ack.

10.8.6 PPC Permission Reject

The PC may choose a client to perform PPC operations. If the chosen device has not volunteered and it does not want the responsibility it can reject such a selection using this subcommand. This allows the devices with power-save mode enabled not to get involved in the proxy service. The subcommand structure is shown in FIG. 43. The ENFI field 331 from PPC Permission Grant command is decremented and sent in the acknowledgment.

The current PPC must use the same subcommand if it decides to relieve itself from the responsibility of being a PPC. The PC is expected to find an alternative or tear down the entire PPC-chain.

10.8.7 PPC Service Break

The PC may break the proxy service link between two devices. Such a decision of the PC is broadcasted in this subcommand. A subcommand structure is shown in FIG. 44.

The reason codes 442 are;
0->the destination device is directly connected
1->device-1 is invalid or not connected anymore
2->device-2 is invalid or not connected anymore
3->One or more of the PPC is absent
4->New chain is being formed

10.8.8 PPC Service Break Ack

This is an ack to a proxy service break subcommand received from the PC. All the current PPCs and the serviced devices send this command. A subcommand structure is shown in FIG. 44. The Time out period 444 in the ack from the client is ignored by the PC.

10.8.9 PPC-OSB Provider Request

This subcommand is used to request a permission from the PC for providing proxy services between overlapping subnets for bandwidth sharing. The OSB commands are discussed in section 10.9. A volunteering client can use this subcommand to volunteer for the PC's responsibility. A subcommand structure is shown in FIG. 45. This command is sent upon the reception of OSB-Req and when PC is not responding to it.

10.8.10 PPC-OSB Provider Accept

The PC may choose one out of several volunteers and send this subcommand to permit that client to be a PC between the two subnets. The client compares the payload of the subcommand with its own and sends an acknowledgment to the PC. A subcommand structure is shown in FIG. 45. The PC can also use the same subcommand to appoint a device to be a PPC for bandwidth sharing between subnets, even though the device has not volunteered to provide the service.

10.8.11 PPC-OSB Provider Reject

In one embodiment, the PC may reject the volunteer using this subcommand shown in FIG. 45. No acknowledgment is expected for this subcommand. The current PC uses the same subcommand if it decides to relieve itself from PC responsibility. This subcommand may be sent from the client to the PC indicating that the current device is rejecting the responsibility of PPC-OSB.

10.8.12 PPC-OSB Provider Ack

This is the acknowledgment for the PC-permission-grant subcommand from the PC, illustrated in FIG. 45. The client accepts and repeats the payload so that the PC may respond to it using PC-OSB subcommand.

10.8.13 PPC-OSB-Tunneling

Once a PPC is chosen for OSB, both the PC and the PPC use PPC-OSB subcommand (shown in FIG. 46) to tunnel the OSB commands between the two subnets. The PC is expected to send out the payload of this subcommand as a separate MAC frame. The PPC also reads and analyzes the communication between the two PCs to keep track of bandwidth negotiation conditions. The PPC also provides beacon service as time reference for the PC of the other subnet.

10.8.14 PPC-OSB Relieve Request

In one embodiment, the current PPC sends this subcommand to relieve itself from the responsibilities before going into sleep mode or shutting off. A command payload is shown in FIG. 47.

10.8.15 PPC-OSB Relieve Request Ack

The PC sends this acknowledgment back to relieve the current PPC-OSB from its proxy responsibilities. The PC finds another device for PPC responsibility or directly communicates the OSB commands. A sample command payload is shown in FIG. 47.

10.9 Overlapping Subnet Bandwidth Negotiation

Figure 48:
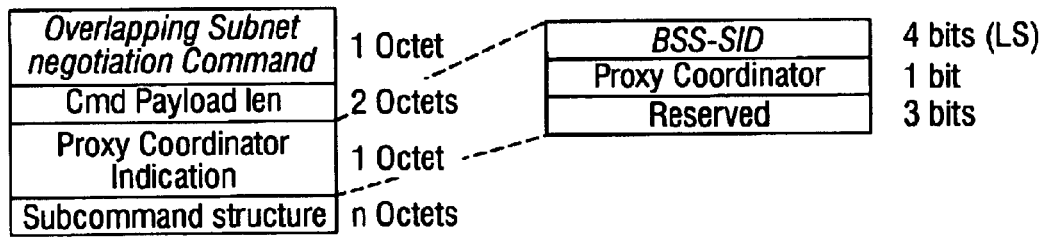
FIG. 48 illustrates an example of an Overlapping Subnet Bandwidth Negotiation command according to one embodiment of the present invention.

In one embodiment of the present scheme, this subcommand, sent by itself as a MAC-frame, includes four subcommands that are used for dynamic (overlapping) bandwidth negotiation among the subnets. The command structure is shown in FIG. 48. The subcommands are discussed in the following sections.

10.9.1 Overlapped Subnet Bandwidth Request (OSB-Req)

Figure 49:
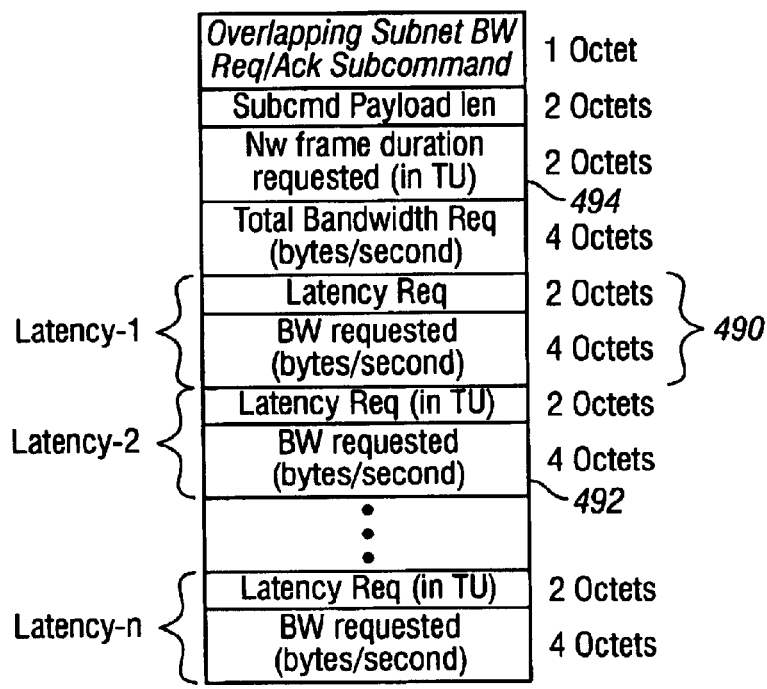
FIG. 49 illustrates an example of an Overlapping Subnet Bandwidth Request subcommand according to one embodiment of the present invention.

The PC in the new subnet uses this subcommand to negotiate bandwidth with the Master coordinator. The subnets that are already sharing bandwidth in the same channel may also use the same command to alter their requested bandwidth. A sample payload structure of this subcommand is shown in FIG. 49.

All the bandwidth requests 492 are presented in bytes per second and all the network frame duration requests 494 are in TUs (1024 microsecs). The Master Coordinator decides the allocated bandwidth and the network frame duration based on requests from all the subnets currently sharing the channel. The other subnets have the option of accepting MC's decision or moving over to some other channel.

Zero bandwidth request means the current subnet does not wish to share the channel anymore either because it moves over to the new channel or because it shuts down.

10.9.2 Overlapped Subnet Bandwidth Request Ack (OSB-Req-Ack)

The MC uses this subcommand to acknowledge the OSB-Req subcommand from other subnets. A payload structure is shown in FIG. 49. This subcommand does not represent bandwidth allocation, but only means that the MC has received the request and is processing the subcommand.

10.93 Overlapped Subnet Bandwidth Grant (OSB-Grant)

The MC uses this subcommand to send the finalized bandwidth parameters to individual coordinators. A payload structure is shown in FIG. 50. All the parameters used in section 7 for network synchronization are made available to the client by the PC in this subcommand.

The network frame size 502 is indicated in a TU (1024 microseconds) field. The Effective network frame index (ENFI) 504 indicates the relative network frame index from which time the Stream Management parameters should be used. An all-one value of ENFI indicates that the subnet has an option to accept the offered bandwidth and send an OSB-Ack message or send a new OSB-Req for negotiation. The MC makes the final decision on bandwidth allocation and sends the OSB-grant message with a valid ENFI to force the decision on the subnet. The subnet has the option of disconnecting if the bandwidth allocation is not acceptable. The MC may periodically resend the OSB-grant message and expect an ack in return. If an ack does not arrive after a predetermined number of attempts, the MC should disconnect the subnet from its group. The bandwidth that was previously allocated to the outgoing subnet may then be granted to other subnets, if required.

The transmission wait time 506 and the slot time 508 in the network synchronization parameter 505 is indicated in microseconds. The OSB-TP 503 in this subcommand transmitted from the MC overrides that specified in all the other subcommands from other PCs. There may be more than one set of parameters sent to any one subnet in this subcommand to accommodate multiple latency requirements of the subnet.

10.9.4 Overlapped Subnet Bandwidth Ack (OSB-Ack)

The OSB-ack subcommand has the same payload format as the OSB-Grant subcommand. The subnet receiving the OSB-grant subcommand is expected to send the agreements back to the MAC in the ack subcommand to indicate its acceptance of the agreements. The ENFI offset 504 in the OSB-ack subcommand is ignored by the MC.

10.9.5 Master Coordinator Relieve Request

The Master Coordinator broadcasts this subcommand to relieve itself from MC responsibilities. The PC with the next lowest BSS-SID should take over the responsibility of the MC. The time out period indicates the time within which a response is expected. The payload for this command is shown in FIG. 51.

10.9.6 Master Coordinator Relieve Request Ack

When an MC sends the MC-Relieve-Request the PC with the next lowest BSS-SID should take over the responsibility of the MC and broadcast this subcommand as the ack. Once that occurs, all the devices in its network should change their BSS-SID to zero. The time out period 512 in this subcommand indicates the time taken for the subnet to synchronize, during which time no OSB requests are entertained. However, the new MC continues to provide beacon services for both the current group of subnets and also for its own subnet separately.

10.10 BSS-SID Allocation

The PC in each subnet must use this command to communicate the BSS-SID 522 that needs to be used by the clients. Note that the PC should broadcast this command whenever there is a change in BSS-SID. The payload for this command is shown in FIG. 52.

10.11 Retransmission

The retransmission command has three subcommands that are described in the following sections. The command structure is shown in FIG. 53. The retransmission command may be transmitted from one specific device to another specific device in a command frame. The address of the source and the destination devices are available from the command frame header or the sub-header if it is a command frame in broadcast mode.

10.11.1 Retransmission Request

Figure 54:
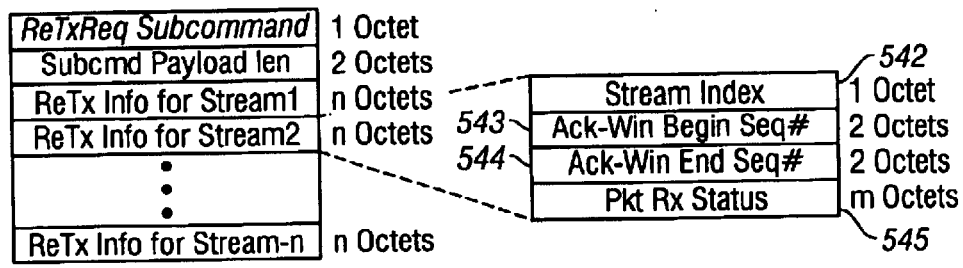
FIG. 54 illustrates an example of a Retransmission Request subcommand according to one embodiment of the present invention.

This subcommand conveys the ack-window from the destination device to the source device. The payload for this command is shown in FIG. 54.

The stream index 542, along with the already known source and destination address, is used to uniquely identify the stream for which the ReTx-Req subcommand is sent. Ack-win Begin Sequence number 543 indicates the stream sequence number of the last nacked MAC frame. The Ack-win End Sequence number 544 indicates the stream sequence number of the most recently received MAC frame.

The MAC-frame-Rx-Status 545 is a bitmap indicating the status of received MAC-frames from the Ack-Win Begin Sequence number 543 to the Ack-Win End Sequence number 544. A bit value of '0' indicates a positive ACK and '1' indicates a negative ACK (NAck). The receive-status of the last NAcked MAC frame, whose sequence number is Ack-win-Begin-Sequence-number 543, is indicated in the least significant bit of the MAC frame-Rx-Status field 545. The receive-status of the most recently received MAC frame, whose sequence number is Ack-win-End-Sequence-number 544, is indicated in the last valid bit of the MAC frame-Rx-Status field 545. Note that this need not be the most significant bit of the MAC frame-Rx-Status field 545. The length of the MAC frame-Rx-Status field 545 may be computed as the difference between the Ack-Win-End-Sequence-number 544 and Ack-Win-Begin-Sequence-number 543, wrapped around if needed, and adjusted to the next byte boundary. Hence there could be some invalid bits at the most significant side of the MAC frame-Rx-Status 545 after the bit representing the status for the MAC frame whose sequence number is Ack-Win-End-Sequence-number 544.

10.11.2 Retransmission Fail

Figure 55:
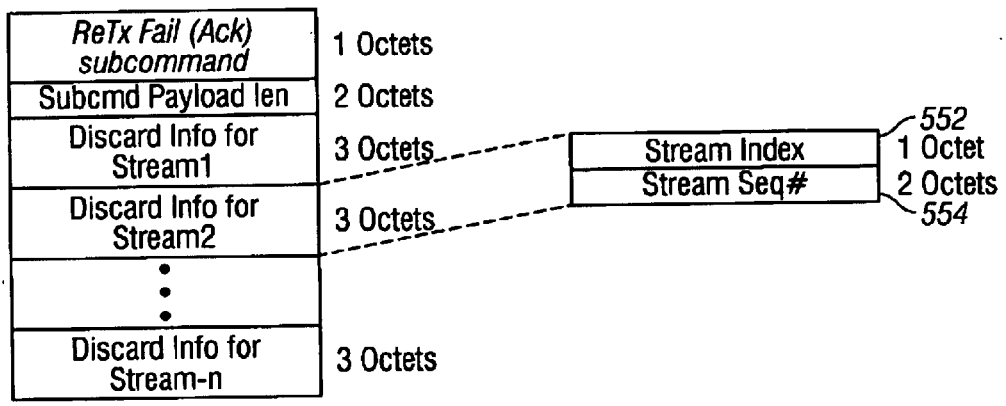
FIG. 55 illustrates an example of a Retransmission Fail subcommand according to one embodiment of the present invention.

This subcommand is transmitted by a source device requesting the receiver to ignore the MAC-frames up to the specified sequence number 554 in a stream identified by its stream index 552. This is required when the source device fails to receive an ack from the receiver and the maximum tolerable delay for that MAC frame has expired. The subcommand structure is shown in FIG. 55.

10.11.3 Retransmission Fail Ack

The destination device sends this subcommand as an acknowledgement to the reception of the Retransmission-Fail subcommand from the source device. A sample subcommand structure is shown in FIG. 55.

10.11.4 Retransmission Resync

Figure 56:
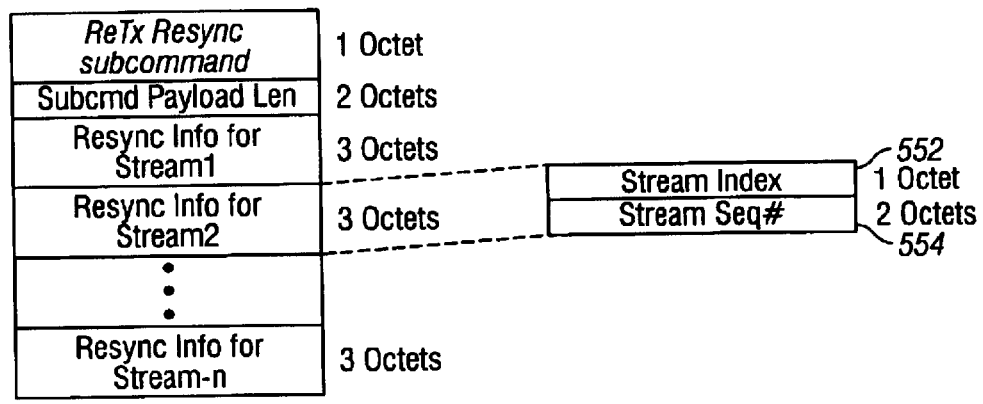
FIG. 56 illustrates an example of a Retransmission Resync subcommand according to one embodiment of the present invention.

This subcommand may be sent by the source device to synchronize the sequence number 564 with the destination device. On receiving this subcommand, the destination device should update its state for the stream to expect this sequence number next. The subcommand structure is same as that shown in FIG. 56.

10.11.5 Retransmission Resync Ack

The destination device sends this subcommand as an acknowledgement to the reception of the Retransmission resync subcommand from the source device. The subcommand structure is same as that shown in FIG. 56.

Thus a set of Qos extensions to support multimedia applications over 802.11 LANs has been described.

What is claimed is:

1. An interface between a wireless network component and a wireless medium, the interface communicating multimedia data streams as defined by a networking protocol that includes definitions of quality of service enhancements to provide reliable communications of said multimedia data streams, the quality of service enhancements comprising a capability information field and a multimedia control field within a media access control frame and including a frame position sub-field, pad byte sub-field, a stream index sub-field, a basic service set identification sub-field and a time stamp sub-field; and wherein the capability information field consists of a multimedia capability bit to indicate whether a device is multimedia enhanced, a proxy point coordinator bit to indicate whether a device can provide proxy services, a alternate point coordinator capability bit to indicate whether a device can be an alternated point coordinator, and a channel sharing bit to indicate whether basic service set is sharing a channel with other overlapping basic service sets; and wherein the multimedia control field consists of 32 bits; wherein the 32 bits of the multimedia control field consists of five sub-fields; and the five sub-fields consist of:

a first 2-bit sub-field indicating a frame position within a series of frames, a second 2-bit sub-field indicating a number of bytes padded in a frame to make an entire frame 4-byte aligned, a third 4-bit basis service set identification sub-field indicating when overlapping subnets need to operate in a same channel, a fourth 8-bit sub-field indicating an index number uniquely identifying the multimedia data streams, in which all values of the index are dynamically assigned and used, a fifth 16-bit time stamp sub-field used to provide support for synchronization of any two streams originating from a device.

2. The interface of claim 1 wherein the quality of service enhancements further comprise a forward error correction based on Reed Soloman coding.

3. The interface of claim 1 wherein the quality of service enhancements further comprise a retransmission mechanism to improve the efficiency of multimedia data stream transmissions.

4. The interface of claim 1 wherein the quality of service enhancements comprise a multimedia type definition in a medium access control header frame.

5. The interface of claim 4 wherein the multimedia type is indicated within a frame control field.

6. The interface of claim 5 wherein the multimedia type is indicated by setting to logic high both bites of a two bite sub-field within the frame control field.

7. A system comprising an interface wherein the interface communicates multimedia data streams as defined by a networking protocol that includes definitions of quality of service enhancements to provide reliable communications of said multimedia data streams, the quality of service enhancements including a capability information field and a multimedia control field within a multimedia control frame and including a frame position sub-field, pad byte sub-field, a stream index sub-field, a basic service set identification sub-field and a time stamp sub-field;

wherein the capability information field consists of a multimedia capability bit to indicate whether a device is multimedia enhanced, a proxy point coordinator bit to indicate whether a device can provide proxy services, a alternate point coordinator capability bit to indicate whether a device can be an alternated point coordinator, and a channel sharing bit to indicate whether basic service set is sharing a channel with other overlapping basic service sets; and wherein the multimedia control field consists of 32 bits, wherein the 32 bits of the multimedia control field consists of five sub-fields; and the five sub-fields consist of:

a first 2-bit sub-field indicating a frame position within a series of frames;

a second 2-bit sub-field indicating a number of bytes padded in a frame to make an entire frame 4-byte aligned;

a third 4-bit basis service set identification sub-field indicating when overlapping subnets need to operate in a same channel;

a fourth 8-bit sub-field indicating an index number uniquely identifying the multimedia data streams, in which all values of the index are dynamically assigned and used;

a fifth 16-bit time stamp sub-field used to provide support for synchronization of any two streams originating from a device.

* * * * *